United States Patent [19]

Bredenberg

[11] Patent Number: 5,918,224

[45] Date of Patent: Jun. 29, 1999

[54] CLIENT/SERVER DATABASE SYSTEM WITH METHODS FOR PROVIDING CLIENTS WITH SERVER-BASED BI-DIRECTIONAL SCROLLING AT THE SERVER

[75] Inventor: David Bredenberg, Los Gatos, Calif.

[73] Assignee: Borland International, Inc., Scotts Valley, Calif.

[21] Appl. No.: 08/506,944

[22] Filed: Jul. 26, 1995

[51] Int. Cl.[6] .................................................. G06F 17/30
[52] U.S. Cl. .................. 707/2; 707/1; 707/8; 707/10; 707/103; 707/200
[58] Field of Search ................. 395/614, 602, 395/601, 603, 608, 495, 616, 610; 707/8, 2, 202, 1, 200, 10, 103

[56] References Cited

U.S. PATENT DOCUMENTS

| 4,594,656 | 6/1986 | Moffett ........................... 395/425 |
| 4,714,996 | 12/1987 | Gladney et al. ................. 395/600 |
| 4,823,310 | 4/1989 | Grand ................................ 707/8 |
| 4,887,204 | 12/1989 | Johnson et al. ................. 364/283.1 |
| 4,897,781 | 1/1990 | Chang et al. ................... 364/222.81 |
| 5,010,544 | 4/1991 | Chang et al. ................... 370/13.1 |
| 5,113,519 | 5/1992 | Johnson et al. ................. 395/600 |
| 5,119,490 | 6/1992 | Kurose .............................. 707/8 |
| 5,133,075 | 7/1992 | Risch ............................... 395/800 |
| 5,151,989 | 9/1992 | Johnson et al. ................. 395/600 |
| 5,204,958 | 4/1993 | Cheng et al. ................... 395/600 |
| 5,265,235 | 11/1993 | Sindhu et al. .................. 395/425 |
| 5,295,261 | 3/1994 | Simonetti ....................... 395/600 |
| 5,317,731 | 5/1994 | Dias et al. ...................... 707/8 |
| 5,333,318 | 7/1994 | Wolf ............................... 395/600 |
| 5,446,858 | 8/1995 | Copeland et al. ............... 395/427 |
| 5,475,837 | 12/1995 | Ishak et al. .................... 395/600 |
| 5,485,607 | 1/1996 | Lomet et al. .................... 707/8 |
| 5,493,728 | 2/1996 | Solton et al. .................. 395/250 |
| 5,495,609 | 2/1996 | Scott .............................. 707/8 |
| 5,555,388 | 9/1996 | Shaughnessy ................. 395/427 |
| 5,560,007 | 9/1996 | Thai ............................... 395/600 |
| 5,604,899 | 2/1997 | Doktor ........................... 395/603 |
| 5,615,367 | 3/1997 | Bennett et al. ................. 395/613 |
| 5,625,815 | 4/1997 | Maier et al. .................... 707/8 |

FOREIGN PATENT DOCUMENTS

WO 91/03024  3/1991  WIPO.

OTHER PUBLICATIONS

Updating Software and Configuration Data in a Distributed Communication Network, by Carl W. Symborski, IEEE 1988 publication, pp. 331–338.

*Primary Examiner*—Thomas G. Black
*Assistant Examiner*—Jean M. Corrielus
*Attorney, Agent, or Firm*—John A. Smart

[57] ABSTRACT

System and methods are described for integrating the navigational semantic model of PC DBMS environments into the set-oriented model of SQL database environments. More particularly, a Client/Server system of the present invention provides native navigational support on the Server side, without emulation through a multitude of SQL commands from the Client. The Database Server surfaces to the Client an API (Application Programming Interface) having calls corresponding to each verb taken from a navigational context. The Server, in turn, is modified to include knowledge of how to process each navigational verb. To support this functionality, the indexing of the Server is modified to provide bi-directional scrolling. In this manner, the system is able to provide more efficient, higher performance navigational support in an SQL database context.

19 Claims, 13 Drawing Sheets

PREFIX COMPRESSION 440

| KEY VALUE | PREFIX LENGTH | DATA LENGTH | DATA |
|---|---|---|---|
| ABC | 0 | 3 | ABC |
| ABD | 2 | 1 | D |
| ABD | 3 | 0 | |
| ABDE | 3 | 1 | E |
| ABDF | 3 | 1 | F |
| BBDF | 0 | 4 | BBDF |

*FIG. 4C*

B-TREE EXAMPLE PAGE 460

| HEADER | NEXT PAGE=0 | RELATION | INDEX | DATA LENGTH=125 |
|---|---|---|---|---|
| LEVEL=0 | 9:0,3,ANN | 2:0,5,BRIAN | | 7:0,7,CHARLIE |
| | 11:4,0,0 | 4:1,3,EB | 10:0,4,JOHN | 6:0,4,MARK |
| 1:0,4,DAVE | 5:0,7,RICHARD | 3:0,5,SARAH | | -2:0,0,0 |
| 8:0,5,PETER | | | | |
| -1:0,0,0 | | | | |

*FIG. 4D*

CLIENT/SERVER DATABASE SYSTEM WITH METHODS FOR PROVIDING CLIENTS WITH SERVER-BASED BI-DIRECTIONAL SCROLLING AT THE SERVER

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

The present invention relates generally to information processing environments and, more particularly, to information access in a data processing system, such as a Database Management System (DBMS).

Computers are very powerful tools for storing and providing access to vast amounts of information. Computer databases are a common mechanism for storing information on computer systems while providing easy access to users. A typical database is an organized collection of related information stored as "records" having "fields" of information. As an example, a database of employees may have a record for each employee where each record contains fields designating specifics about the employee like name, home address, salary, and the like.

Between the actual physical database itself (i.e., the data actually stored on a storage device) and the users of the system, a database management system or DBMS is provided as a software cushion or layer. In essence, the DBMS shields the database user from knowing or even caring about underlying hardware-level details. Typically, all requests from users for access to the data are processed by the DBMS. For example, information may be added or removed from data files, information retrieved from or updated in such files, and so forth, all without knowledge of underlying system implementation. In this manner, the DBMS provides users with a conceptual view of the database that is removed from the hardware level. The general construction and operation of a database management system is known in the art. See e.g., Date, C., *An Introduction to Database Systems,* Volume I and II, Addison Wesley, 1990; the disclosure of which is hereby incorporated by reference.

DBMS systems have long since moved from a centralized mainframe environment to a de-centralized or distributed desktop environment—appearing as Personal Computer Database Management Systems (PC DBMS) on the desktops of most (PC) users. Common examples of PC DBMSs include Borland's DBASE® and Paradox®. More recently, PC DBMS systems have been connected via a network to a server-based database system (SQL database server) to form a client/server database system, such as connecting DBASE® clients to an Interbase® database server. As the migration to client/server continues, more and more PC end users are connected to served-based SQL database systems each day.

This has created a problem, however. Users of PC DBMS have come to expect certain navigational functionality from a database system. Specifically, users expect bidirectional scrolling, such as is common during a "browse" mode of operation. Additionally, users expect to be able to jump to a particular location in the database file, the location being specified either as an offset or as a particular record number. Examples of the latter include the dBASE commands of GOTO TOP, GOTO BOTTOM, and GOTO RECNO(). All told, there are certain lower-level "verbs" which users expect when using a database system on the desktop.

Although the task of providing such functionality for a record-based or navigational database system is fairly straightforward, the task becomes problematic when attempted in an SQL-based database server environment. In particular, SQL databases are set-oriented; they have no notion of physical record locations, such as record numbers and record offsets. When the client attaches to a database via a SQL driver, the server has no context information such as the current index or the current position within the index. Thus, the client must maintain all this information, generating requests to change the current record.

How SQL-oriented systems try to address the problem is to emulate the desired action on the client side using clever caching mechanisms and issuing one or more SQL queries. Consider, for instance, a user request to scroll backwards through a group of records. This request would be satisfied by a system issuing a SQL query specifying a sort, in descending order, on a particular field. The database server, in response to such SQL commands, would provide the client with an answer set (i.e., copy of records satisfying the SQL query). The client then scrolls forward through the answer set, but, since it is sorted in descending order, it appears to the client user that he or she is scrolling backwards through the records. There are inherent drawbacks to this strategy, though. The strategy fails when the user traverses off the end of the cache. Also, the cached records will not be up-to-date with the current value on the server. A similar disadvantage occurs when a PC client requests a particular record order (i.e., set order to a particular index). Since SQL servers are set-oriented, the operation of setting to an index requires throwing away all current requests, looking up the new index, and emulating traversal on that index by sorting on the columns of the index.

Although an emulation approach is workable, it occurs a substantial performance penalty for the database system. For instance, the client must generate an appropriate SQL query which the database server, in turn, must parse and process. Further, as part of the approach, the server must perform a sort—a task which consumes substantial resources for the large database tables which are typically employed in corporate settings. Moreover, as a PC database user typically employs one or more indexes for specifying a sort order for the database, the client must take into account these indexes when specifying the descending sort.

The SQL set-oriented model is inadequate for handling the navigational model of database access common to PC databases. What is needed are systems and methods which provide the convenience and familiarity users associate with navigational databases, yet provide that in the context of an SQL database environment. The present invention fulfills this and other needs.

SUMMARY OF THE INVENTION

The present invention comprises a database system with methods for integrating the navigational semantic model of PC DBMS environments into the set-oriented model of SQL database environments. In particular, the present invention includes a Client/Server system which provides native navigational support on the server side of the system, without emulation of navigation through a multitude of SQL commands from the client.

In an exemplary embodiment, the system includes a client (e.g., PC workstation) connected to a server, via a network. In a preferred embodiment, the client communicates with an SQL database resident on the server via an SQL interface (e.g., database API) and SQL link (i.e., SQL driver). To provide native navigational support, the SQL-based database server is modified. Specifically, the functionality of the database engine underlying the SQL database server is extended to include direct support for navigational "verbs." The engine, in turn, includes handlers corresponding to each verb, for providing necessary functionality for achieving native navigational support. However, providing native navigational support at the engine alone is not sufficient for achieving full navigational support (e.g., scrollable cursors).

Other modules of the server are modified for achieving navigational support. The basic indexes which support logical views of the servers relational database tables are modified to support navigational capability. Still further, new index traversal methods are created for processing the modified indexes. The indexes themselves are modified so that the database server can navigate both forward and backward within the index structures (i.e., B-trees) themselves. This task is complicated since index key values are stored in prefix-compressed format.

The indexes are modified so that the Database Server can navigate both forward and backward within a particular leaf-level page of the B-tree indexes themselves. Specifically, each B-tree leaf pages, upon expansion into a corresponding expanded leaf pages, stores not only uncompressed key values but also the length of the prior key ($L_1$) and the length of the current key ($L_2$). This allows the system to go forward to the next node or backward to the previous node, even though the key values at the nodes are prefix compressed. The lengths may be expressed in terms of relative (or even absolute) offsets. The expanded pages themselves are maintained in a buffer cache, which is located (conceptually) between the Database Server and the database table. When a page is expanded, therefore, it is assumed that it will be needed again (i.e., by the current process or by another process). When navigating back and forth in an index, the system can utilize a previously-expanded page, so long as another process is not updating that specific page. When the original B-tree page is updated, the expanded page is released (i.e., free from memory).

Further, each of the leaf pages stores the amount of prefix compression for the page so that the memory buffer required for expansion of that page is known before the actual expansion (i.e., into an expanded index page) is performed. Since the memory buffer required for holding the largest "theoretical" index page which has expanded can be quite large, on the order of 100 megabytes or more, the system maintains a running count of expanded (uncompressed) space required by each node. As a now node Is added, the running count is updated accordingly. In this manner, pages can be expanded in an efficient manner.

The indexes are further modified so that the Database Server can navigate both forward and backward between leaf-level pages of the B-tree indexes. The leaf pages are modified to add, in addition to forward page links, backward page links. Each leaf page on disk stores two page numbers: one pointing forward and another pointing backward. Thus, each page stores a page pointer or ID for identifying both the previous and the next (logical) page (i.e., in chain of pages). The pages themselves need not be stored contiguously an disk. Instead, the system, using the page identifiers or numbers stored on disk, loads relevant pages on an "as needed" basis.

The root page stores page numbers so that the root page stores key/page number combinations. Thus, the root page resembles the leaf pages in that it stores key values which are prefix compressed; instead of storing record numbers, however, the root page stores page numbers. The page numbers, in turn, refer to the pages as they are stored on disk. To access page number 101, for instance, the system would seek to a location which is the value of the page number (e.g., 101) multiplied by the size of the page (e.g., 1024 bytes). The page numbers, therefore, refer to offsets within the particular file set which comprises a single logical file (which may be made up of one or more physical files).

Besides modifying indexes, the system also modifies the "handoff" of pages, when traversing from one page to another. The task of navigation is complicated since the conventional scheme of a locked "handoff" for traversing from one page to another cannot be employed at the same time in reverse: such an approach would result in deadlocks. Left-to-right interpage navigation may be done in a conventional manner, by using a locked handoff. The right-to-left navigation cannot be done in the same conventional manner, however, as deadlocks will result.

A fault-tolerant method for traversing prior pages (i.e., right-to-left traversal), yet avoiding deadlocks, is as follows. The current page is released and the system proceeds to the previous page. Once at the previous page, the system checks whether that page's forward pointer points to the page which was just left. If the two are not identical, the system reads the forward pointer of the then-current page and then traverses to the right. It continues this rightward traversal until it reaches the page which it originally departed from. Once there, the system repeats the process of going left until it reaches a page whose forward pointer agrees with the page which was just departed from. Instead of handing off, therefore, the system just assumes at the outset that the new page is correct. That assumption is then verified to confirm that the new page's forward pointer agrees with the page number of the page which was departed from. If the validation does not hold true, the system steps rights until it returns to the original page, whereupon it repeats the process until a new page is found whose forward pointer agrees with the page number of the original page.

Other methods are described for natural order navigation, setting "bookmarks," and retrieving records by "record number."

BRIEF DESCRIPTION OF THE DRAWINGS

FIG. 4C is a diagram illustrating use of prefix compression for storing key values.

FIG. 4D is a block diagram illustrating a simple B-tree index page, one having a single level, in the system of the present invention.

DETAILED DESCRIPTION OF A PREFERRED EMBODIMENT

The following description will focus on the presently preferred embodiment of the present invention, which is operative in the Microsoft® Windows environment operating PC DBMS clients connected to SQL-based server(s). The present invention, however, is not limited to any particular one application or any particular windows environment. Instead, those skilled in the art will find that the system and methods of the present invention may be advantageously applied to a variety of system and application software, including database management systems, wordprocessors, spreadsheets, and the like. Moreover, the present invention may be embodied on a variety of different platforms, including Macintosh, UNIX, NeXTSTEP, and the like. Therefore, the description of the exemplary embodiments which follows is for purposes of illustration and not limitation.

System Hardware

Figure 1A:
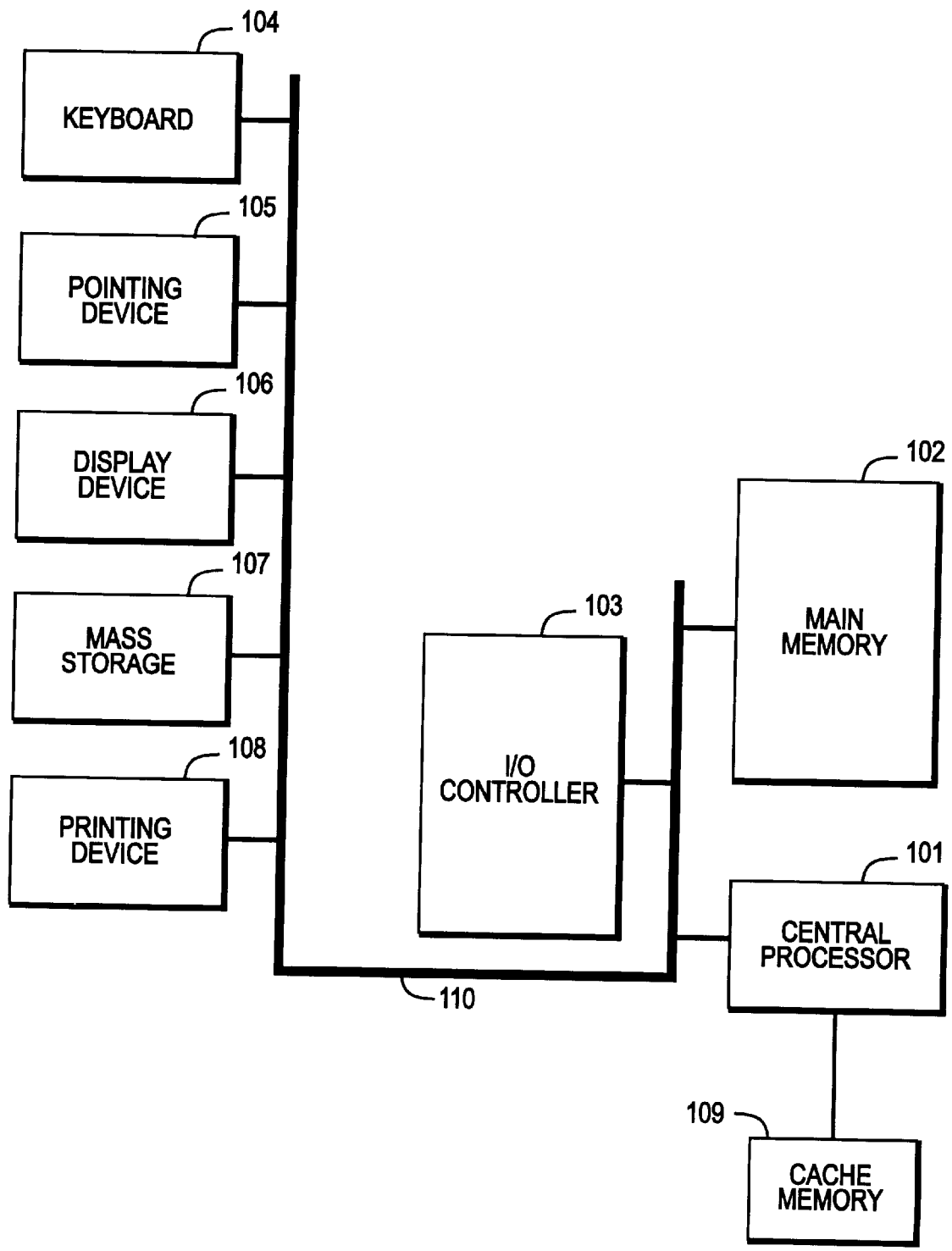
FIG. 1A is a block diagram of a computer system in which the present invention may be embodied.

The invention may be embodied on a computer system such as the system 100 of FIG. 1A, which comprises a central processor 101, a main memory 102, an input/output controller 103, a keyboard 104, a pointing device 105 (e.g., mouse, track ball, pen device, or the like), a display device 106, and a mass storage 107 (e.g., hard or fixed disk, optical disk, magneto-optical disk, or flash memory). Processor 101 includes or is coupled to a cache memory 109 for storing frequently accessed information; memory 109 may be an on-chip cache or external cache (as shown). Additional input/output devices, such as a printing device 108, may be included in the system 100, as desired. As shown, the various components of the system 100 communicate through a system bus 110 or similar architecture. In a preferred embodiment, the system 100 is an IBM-compatible personal computer system, available from a variety of vendors (including IBM of Armonk, N.Y.).

System Software

Figure 1B:
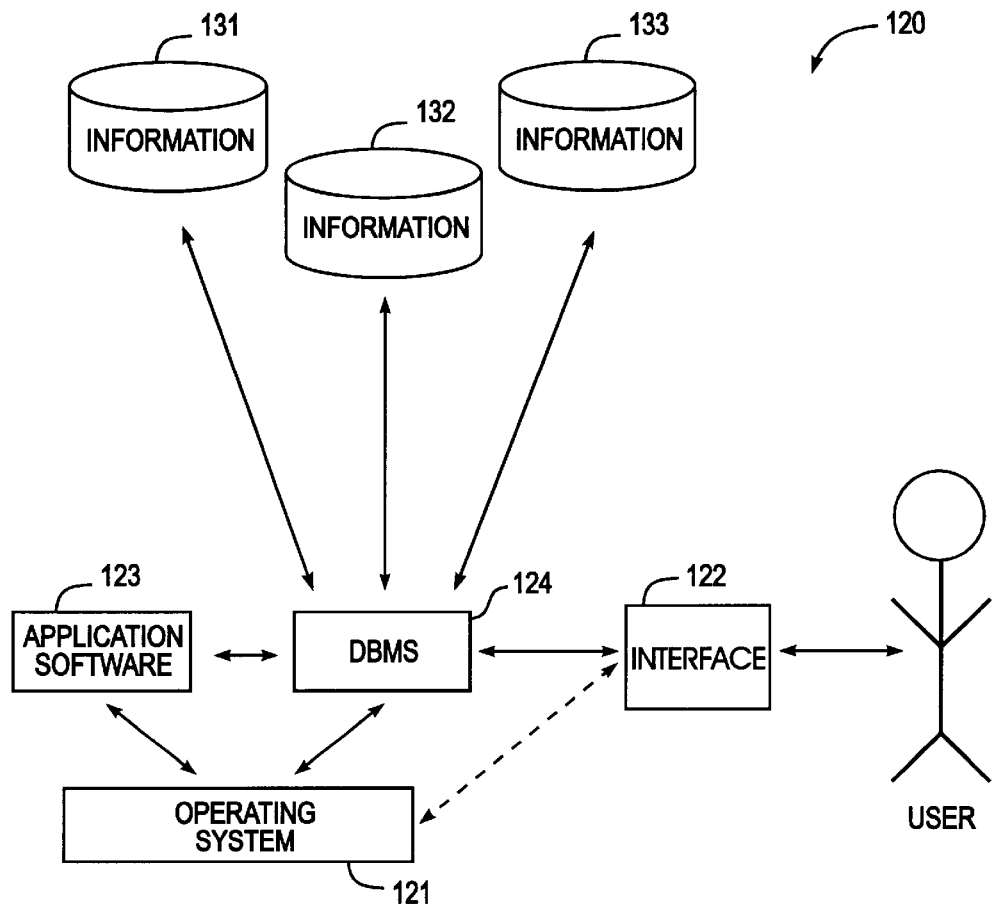
FIG. 1B is a block diagram of a computer software system for programming the operation of the computer system of FIG. 1A.

Illustrated in FIG. 1B, a computer software system 120 is provided for programming the operation of the computer system 100. Software system 120, which is stored in system memory 102 and on disk memory 107, includes a kernel or operating system 121 and a DBMS 124. OS 121 is the executive or supervisor for the system 100, directing both task management and data management.

Illustrated in FIG. 1B, a computer software system 150 is provided for directing the operation of the computer system 100. Software system 150, which is stored in system memory 102 and on disk memory 107, includes a kernel or operating system (OS) 140 and a windows shell 145. One or more application programs, such as application software 125 or one or more windows application software 151, 153, 155, may be "loaded" (i.e., transferred from storage 107 into memory 102) for execution by the system 100. As shown, windows application software includes a Relational Database Management System (RDBMS) 155 of the present invention.

System 150 includes a user interface (UI) 160, preferably a Graphical User Interface (GUI), for receiving user commands and data. These inputs, in turn, may be acted upon by the system 100 in accordance with instructions from operating module 140, windows 145, and/or application modules 125, 151, 153, 155. The UI 160 also serves to display the results of operation from the OS 140, windows 145, and applications 125, 151, 153, 155, whereupon the user may supply additional inputs or terminate the session. Although shown conceptually as a separate module, the UI is typically provided by interaction of the application modules with the windows shell, both operating under OS 140.

In a preferred embodiment, OS 140 is MS-DOS operating system software running Microsoft Windows; both are available from Microsoft of Redmond, Wash. The general methodology for creating windows-based applications is known in the art; see, e.g., Petzold, C., *Programming Windows*, Second Edition, Microsoft Press, 1990. Additional information can be found in Microsoft's Window Software Development Kit, including: 1) *Guide to Programming*, 2) *Reference, Vols.* 1 *and* 2, and 3) *Tools*, all available from Microsoft Corp. of Redmond, Wash. The disclosures of each of the foregoing are hereby incorporated by reference.

DBMS 124, on the other hand, is a software subsystem for storing, retrieving, and manipulating information in database tables (e.g., tables 131, 132, 133). Under the command of DBMS 124, the system 100 receives user commands and data through user interface 122. Interface 122 may include a built-in query surface or editor for accessing and processing database information. Additional application programs, such as DBMS application software 123, may be "loaded" (i.e., transferred from storage 107 into memory 102) for execution by the system 100, particularly for further controlling the operation of DBMS 124. DBMS 124 includes Paradox® for Windows Database Management System (available from Borland International of Scotts Valley, Calif.) operating in a shared environment, such as in a client/server configuration running in a Local Area Network (LAN) environment (described hereinbelow with reference to FIG. 1D). If desired, other operating systems and/or DBMSs (or alternative configurations thereof) may be employed in accordance with the principles of the present invention.

Figure 1C:
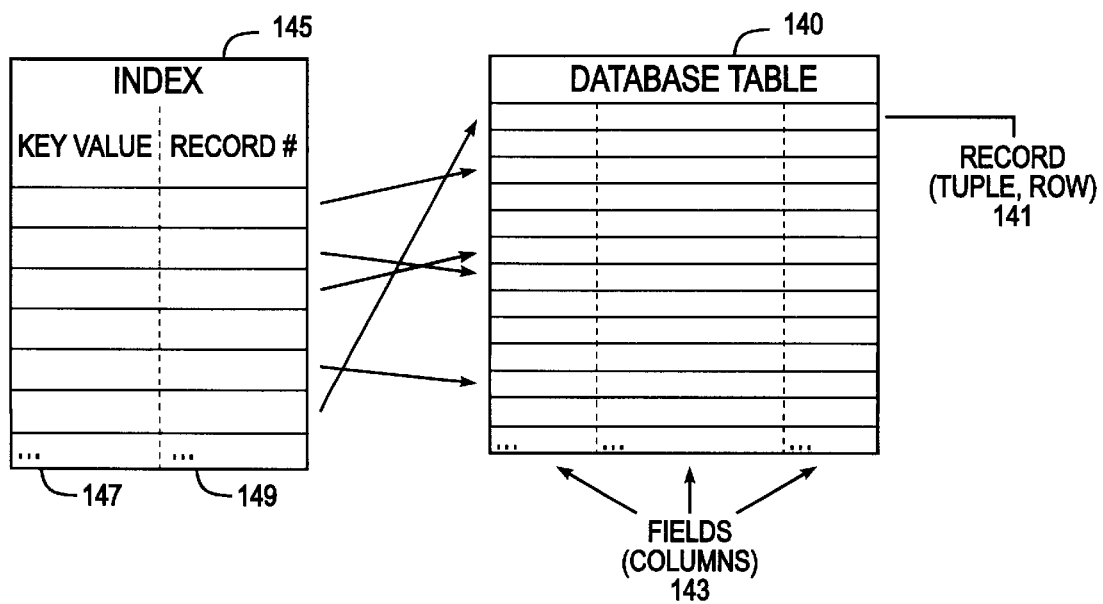
FIG. 1C is a block diagram illustrating the relationship between a database table and its index.

At the outset, it is helpful to understand general techniques for storing information, such as in DBMS 124. In a database management system, information is conveniently organized into tables, such as table 140 of FIG. 1C. As conceptually shown, table 140 typically includes horizontal rows or records (tuples) 141 and vertical columns or fields 143. A database record includes information which is most conveniently represented as a single unit. A record for an employee, for example, may include information about the employee's ID Number, Last Name and First Initial, Position, Date Hired, Social Security Number, and Salary. Thus, a typical record includes several categories of information about an individual person, place, or thing. Each of these categories, in turn, represents a database field. In the foregoing employee table, for example, Position is one field, Date Hired is another, and so on. With this format, tables are easy for users to understand and use. Moreover, the flexibility of tables permits a user to define relationships between various items of data, as needed.

A given table may be interrelated to other data objects, including for example index, report, and form files. A database index allows the records of a table to be organized in many different ways, depending on a particular user's needs. As shown by index 145 of FIG. 1C, for example, an index may be constructed as a single disk file which is referred to internally by the system for locating and displaying records in a database file. Index 145 stores index key values 147 and unique record numbers 149. The former is a data quantity composed of one or more fields from a record used to arrange (logically) the database file records by some desired order (index expression); the latter are unique pointers to the actual storage location of each record in the database file.

Network Architecture

A. Network Hardware

Figure 1D:
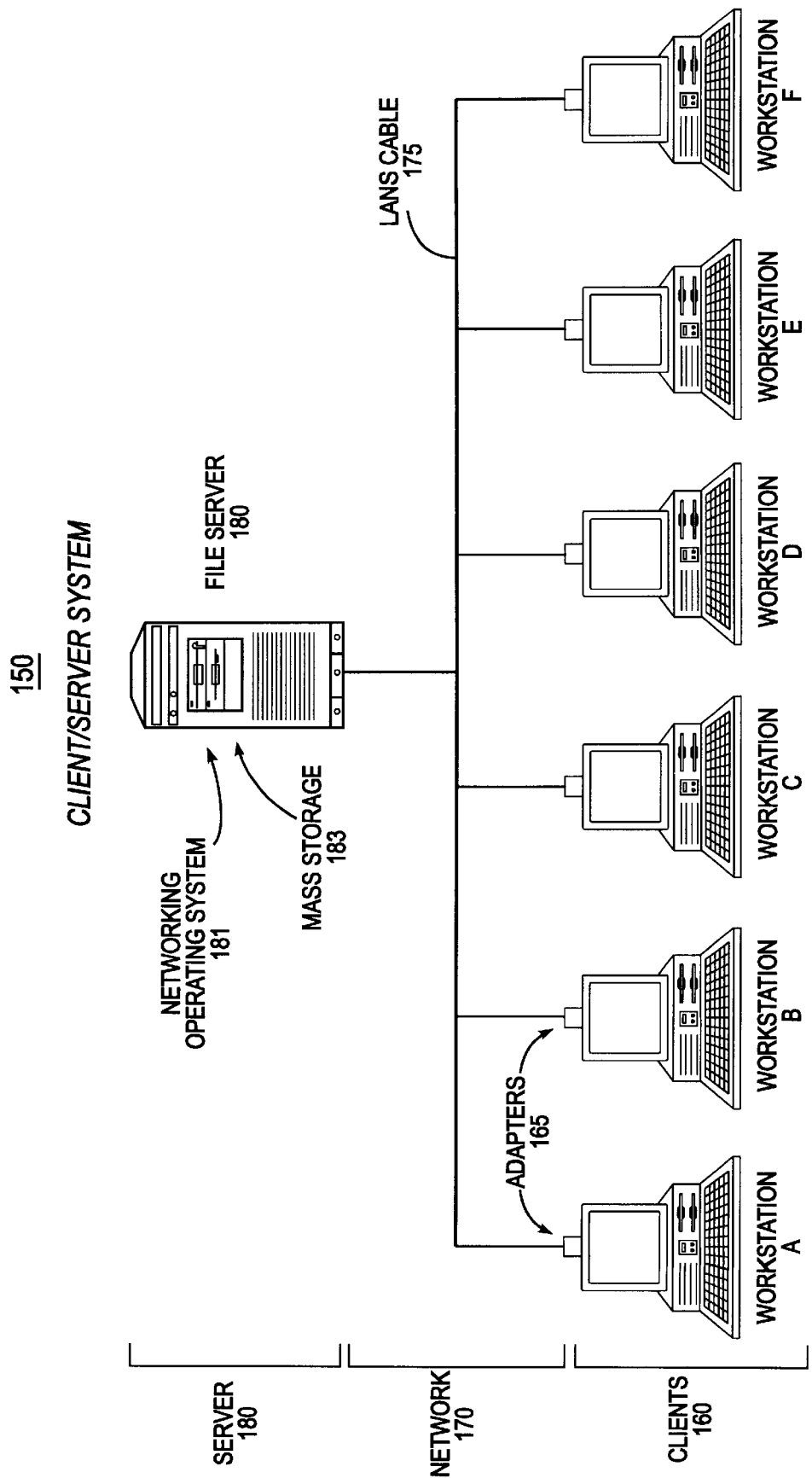
FIG. 1D is a block diagram of a client/server system configuration which may be employed for embodying the present invention in a Local Area Network (LAN) environment.

While the present invention may operate within a single (standalone) computer (e.g., system 100 of FIG. 1A), the present invention is preferably embodied in a multi-user computer system, such as the Client/Server system 150 of FIG. 1D which includes system 100. Specifically, system 150 includes a first computer or Server 180 and one or more second computers or Clients 160. In an exemplary embodiment, the Clients or workstations 160 are connected to Server 180 through a computer network 170, which may be a conventional Local Area Network (LAN). Network 170 includes cabling or network links 175 for connecting the Server and each workstation to the network. The workstations themselves will be similar to or the same as system 100; additionally, each typically includes an adapter 165 for receiving the network cable 175. Server 180 may also be similar to or the same as system 100. Because the Server manages multiple resources and objects for the clients, it should preferably include a relatively faster processor, larger mass storage, and more system memory than is found on each workstation.

Overall operation of the system 150 is directed by a networking operating system 181, which may be stored in the Server's system memory; in a preferred embodiment, OS 181 includes NetWare®, available from Novell of Provo, Utah. In response to requests from the Clients 160, the Server 180 provides various network resources and services. For instance, multiple users (e.g., workstations A, B, and C) may view a database table stored in file Server storage 183, while another user (e.g., workstation E) sends a document to a network printer (not shown).

The general construction and operation of a computer network has been well documented in the technical, trade, and patent literature. For a general introduction to a Local Area Network operating under NetWare, see Freed, L. et al., *PC Magazine Guide to Using NetWare*, Ziff-Davis Press, 1991. A more detailed discussion is available in NetWare 3.x and 4.x and accompanying documentation, which is available from Novell of Provo, Utah. For a discussion of a computer network employing Microsoft Networks/OpenNet File Sharing Protocol, see METHOD AND SYSTEM FOR OPPORTUNISTIC LOCKING IN A NETWORKED COMPUTER SYSTEM, Intl. Application No. PCT/US90/04570, Intl. Publication No. WO 91/03024, Intl. Publication Date Mar. 7, 1991. The disclosures of each of the foregoing is hereby incorporated by reference.

B. Client/Server Database Management System

Figure 2:
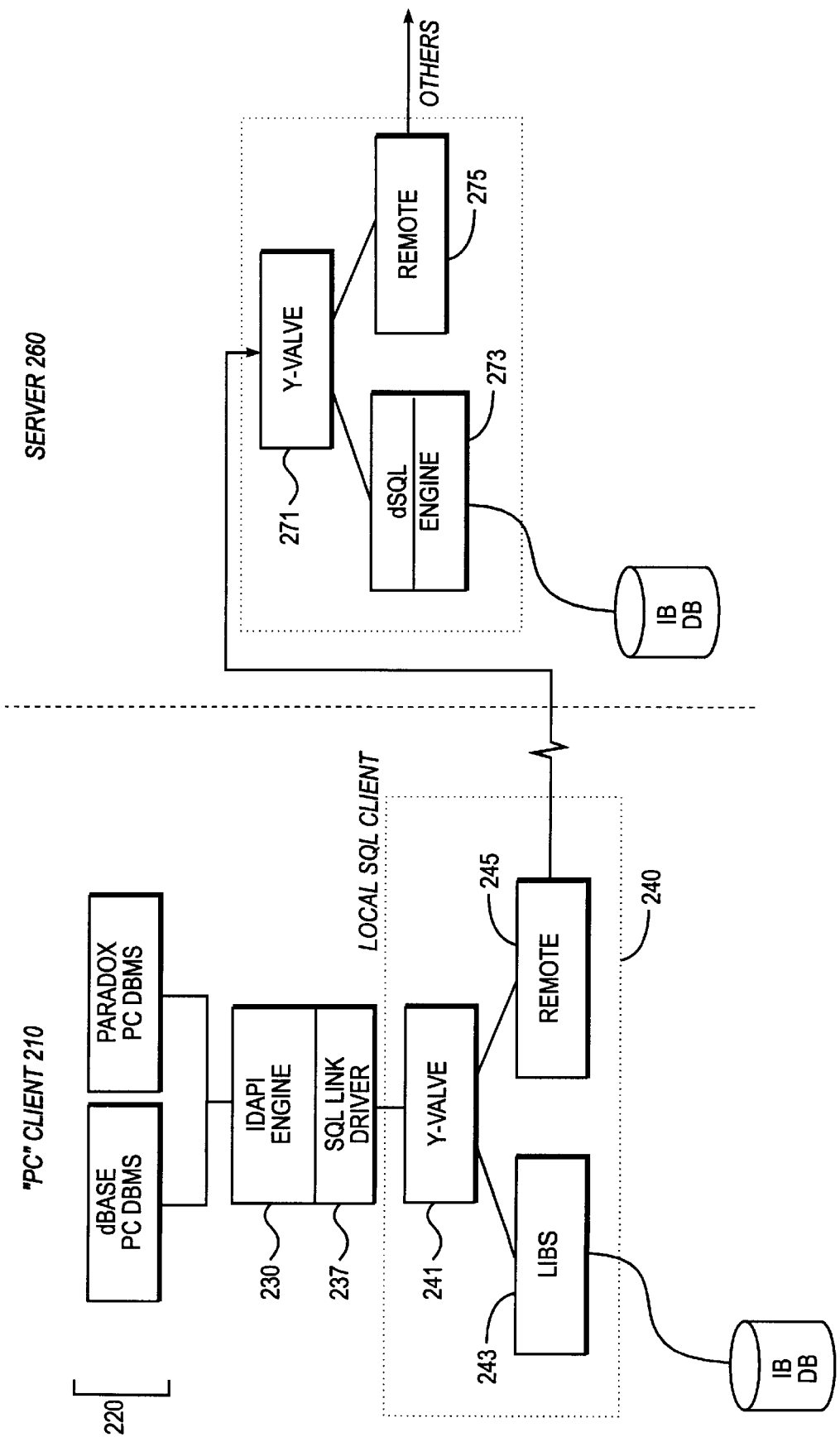
FIG. 2 is a block diagram illustrating a Client/Server Database Management System of the present invention.

FIG. 2 is a block diagram providing an overview of the Client/Server Database Management System 200 which includes a Client (e.g., PC workstation) 210 connected via a Network 250 to a Server 260. The Client 210 comprises (e.g., dBASE or Paradox). The Client 220 is, in turn, connected to a Database Local Engine 230 via an Interface Layer 235 (which is generally a database API layer). The Local Engine 230 then connects to an SQL database via an SQL Link 237. In an exemplary embodiment, the Database Frontend 220 may be dBASE or Paradox, the Database Engine 230 may be Borland Database Engine, the Interface Layer 235 may be IDAPI, and the SQL Link 237 may be Borland SQL Link. All of the foregoing are available from Borland International of Scotts Valley, Calif. Those skilled in the art will appreciate, however, components from other vendors may be applied in accordance with the present invention. For instance, the Client 220 may include Microsoft Access or Microsoft FoxPro. Similarly, the Database Engine 230 may include the Microsoft Jet Engine, with the Interface Layer being the Jet API. In such an embodiment, the SQL Link Layer 237 would typically include ODBC (Open Database Connectivity, available from Microsoft).

SQL Link Layer 237, in turn, connects to a local SQL Client 240. In an exemplary embodiment, the SQL Local Client comprises the Local Interface Engine, available from Borland International. In such an embodiment, the local SQL Client 240 includes a Y Valve 241, a Local SQL Server 243, and a Remote Interface 245. In an exemplary embodiment, the Local SQL Server comprises Borland's Local Interbase Server (LIBS), available from Borland International.

The Local Server 243 and the Remote Interface 245 surface essentially identical SQL database APIs. The Y Valve 241, therefore, functions to determine whether a particular SQL call coming in from the SQL Link Module 237 is serviced locally (by the Local Server 243), or remotely via the Remote Interface 245 (which in turn will call on to the SQL Database Server residing on the Server 260). In other words, a call into the Y Valve 241 is routed either locally (to Server 243) or remotely (to Interface 245). The Remote Interface 245 includes functionality for packaging the SQL call and its parameters into a format (of one or more packets) suitable for transmission across the Network 256, for delivery to the Server 250.

As shown in the figure, the call or request is passed on to the Network 256 from the Remote Interface 245 arrives at the Server 250 specifically at a second Y Valve, shown as Y Valve 271. The Y Valve 271, in turn, makes the same decision as the first Y Valve: whether to handle the request locally (to its Server) or route the call to another Server, via Remote 275. If the Y Valve 271 routes the call locally (i.e., local to Server 260), then the call is passed onto the SQL Database Engine 273. The SQL Engine 273 may be similar to or the same as Local Server 243. In a preferred embodiment (specifically using Interbase), the Engine 273 is a version of Server 243 running under Windows NT or UNIX. In effect, the two engines are the same; however, each generally runs under a different operating system (e.g., such as the Client Database 243 running under a Client Operating System and the Engine 273 running under a Server Operating System).

As shown in FIG. 2, this scheme may continue on to yet another server, chained to as many additional servers as desired. In essence, the Client has a "virtual" view of the data. In other words, the Client submits an SQL command for operation on particular data, without having any concern about where the particular data actually resides. The data may, for instance, reside on a server five or more Y-Valve levels out. The propagation of data end results is handled transparently to the user.

Navigation access in a SQL-based database server system

A. Overview

The SQL Server surfaces a number of verbs to the local engine (i.e., Engine 230). Before describing this, however, it is helpful to further examine the interface between the SQL Engine (e.g., 273) and the Local Client/Engine (e.g., 230). In operation, the SQL Engine manifests a number of API calls, which are entry points to the functions or subroutines of the SQL Engine. To invoke a particular function, therefore, the Local Engine 230 makes "calls" into the SQL Engine (e.g., SQL Link Driver 237). In response to such calls, the SQL Engine generally performs one or more tasks and, depending on the particular operation, returns a result back to the Client Engine 230.

B. Low-Level Calls from the Client to the Server

In a preferred embodiment of the present invention, driver access to a SQL database engine is not SQL-based. It is, instead, a lower-level access using a lower-level data access language of BLR—Binary Language Representation (available with InterBase, from Borland International of Scotts Valley, Calif.). In this manner, the driver can generate a single request to handle navigational semantics. Thus, the semantic model is not emulated; the Server maintains the context information required to traverse the table and reset the current index.

Of particular interest to the present invention is the following API call: isc_compile_request (blr_string). This particular call represents a low-level link to the SQL Engine. The blr_string (Binary Language Representation string) itself is a byte-encoded string, representing a series of opcodes. It is the native language of the engine itself. This allows requests to be generated by the driver which are capable of going forward and backward through a table, setting a current index, finding a record by key value, updating a record, and the like. In short, the request is capable of doing all the operations supported by the navigational interface, yet does not require recompilation.

The request itself may be thought of as a large case statement. Once the request is sent to the Server, the driver communicates with the running request via messages. Each message type corresponds to an operation in the Client or local engine, so that the Server is kept apprised of the end user's current state. The Server itself performs the operation on behalf of the Client, rather than the driver emulating the operation. The request will branch and perform various actions based on the state information passed to it and, thus, may be large. Generally, few requests are generated to compile. Since more state information is passed to the request rather than compiled into it, it does not have to be recompiled often.

A blr string actually forms a small self-contained program, such as the following:

```
blr_begin
    blr_message
    .
    .
    .
    blr_loop
    blr_assign
blr_eoc
```

As shown, tt includes variable declarations, assignments, loop constructs, block delimiters (e.g., begin and end), messages, and the like. The "messages" defined within the blr_string are the messages passed back and forth, between the Client and the Server. A blr_string defines one or more actions to be carried out at the Server (e.g., conditional logic). Since the blr_string already represents the low-level native language of the Server, the Server may map it (i.e., compile it) into a parse tree structure suitable for conversion into machine language instructions (for the target processor). In other words, the string is compiled into a tree which the SQL Engine knows how to execute. In a preferred embodiment, using Interbase from Borland, the Engine itself structured as a series of actual machine instructions (conceptually) arranged as a large switch or case statement, for execution upon receipt of a particular node of the parse tree.

Particular blr low-level verbs are added to the system. For instance, the navigational command of "SEEK" (corresponding, for example, to the dBASE command of SEEK), is implemented as a blr_seek command. This will now be examined in further detail.

C. Providing navigational capability to a set-oriented (SQL) database server

According to the present invention, the database Server allows the Client to define a navigational string. Since the Server supports the underlying navigational semantics of the Client, no semantic mapping is necessary. In an exemplary embodiment, the following navigational capabilities are supported: Set current index or set to natural order; go to next record; go to previous record; seek forward or backward a specified number of records; go to the beginning or end of the table; search for a key value, including a partial key; and find a particular record in a navigational stream. The following describes the BLR to perform these operations.

(1) BLR streams

To support navigational semantics, a stream expression is introduced. This expression is similar to a record selection expression (RSE) used by SQL-type requests. Only a subset of the capabilities is supported, in order to reduce the amount of error checking needed. The stream expression is used to specify a single table to use in retrieving records. The "blr_stream" construct is a limited version of "blr_rse," in that joins, sorts and aggregates are not permitted.

The syntax for the blr_stream expression is:

blr_stream {blr_relation relation_name|blr_rid id}stream [boolean-expression]
blr_end Stream numbers used in blr_stream and blr_rse expressions are unique. The boolean-expression is a restriction on the records that will be retrieved. Its syntax is identical to the boolean-expression for the blr_rse expression, and it is used to implement filters and other restrictions on records in a navigational stream.

(2) Current index

By default, navigation on a stream is done in natural order. The request may change that order dynamically by resetting the current index. This is done with the following syntax:

blr_set_index stream
[index-id]

where stream refers to a previously declared blr_stream number, and index-id is a value expression evaluating to the index ID to use. All subsequent seeks on this stream are done with respect to this index. An index-id of 0 indicates that the index should be reset to natural order.

(3) Seeking through a stream

To move through an RSE, the blr_for construct is used to automatically loop forward through the records. The blr_stream statement is used to declare a stream anywhere within the request (provided it is declared before it is referenced). The new statement "blr_seek" is used to move forward and backward through the stream. The syntax for the seek statement is:

blr_seek stream direction offset
where stream refers to a blr_stream number, offset is an expression evaluating to an unsigned long, and direction is a single byte indicating: (1) blr_forward: move offset records forward from the current record; (2) blr_backward: move offset records backward from the current record; (3) blr_bof_forward: start at the beginning of the stream and move forward offset records; and (4) blr_eof_backward: start at the end of the stream and move backward offset records.

(4) Finding a Key Value

The statement "blr_fmd" sets the current record in a stream to a record of a given key value. The syntax for the find statement is:

blr_fmd stream operator backwards arg_count value-expression1, . . . , value-expressionN where stream is defined as a previous blr_stream number and operator is one of the following values: blr_lss, blr_leq, blr_eq, blr_geq, blr_gtr. These indicate the comparison operation to perform on the record stream. For example, if a "blr_geq" is specified, the Server will find the first record whose key value is greater than or equal to the specified key. The backwards argument is a byte of value 0 to indicate that the search direction is forwards, or value 1 to indicate that the search direction is backwards; arg_count is a count of the number of value-expressions to follow, where value-expression is compared with a single segment of the key in the current index. The value-expression may be a partial key operation, such as searching for last name on an index defined on last name, first name, in which case arg_count is less than the actual number of keys in the index.

(5) Finding a Record

To find a particular record when the dbkey is known, the following statement was added:

blr_find_dbkey stream dbkey where stream is a previously defined stream number, and dbkey is an eight-byte quantity evaluating to a dbkey previously retrieved via the blr_dbkey expression. Whether the table is specified in indexed or natural order, the find_dbkey statement fetches the record specified by the dbkey, and sets the current position of the stream to the position of that record. Whether the stream was set to the same index when the dbkey was fetched is not important.

Internal operation

A. Scrollable cursors

Figure 3A:
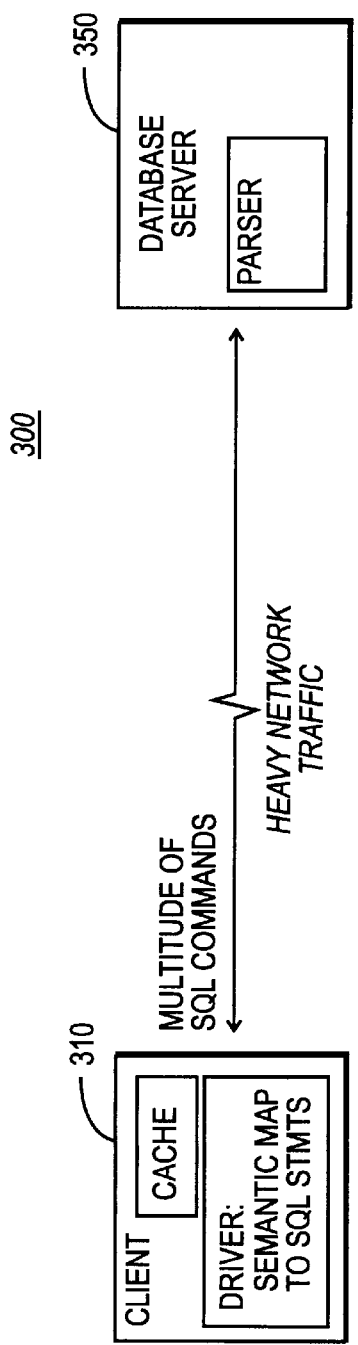
FIGS. 3A–B are block diagrams illustrating how a client/server system may be modified, in accordance with the present invention, for providing scrollable cursors.
Figure 3B:
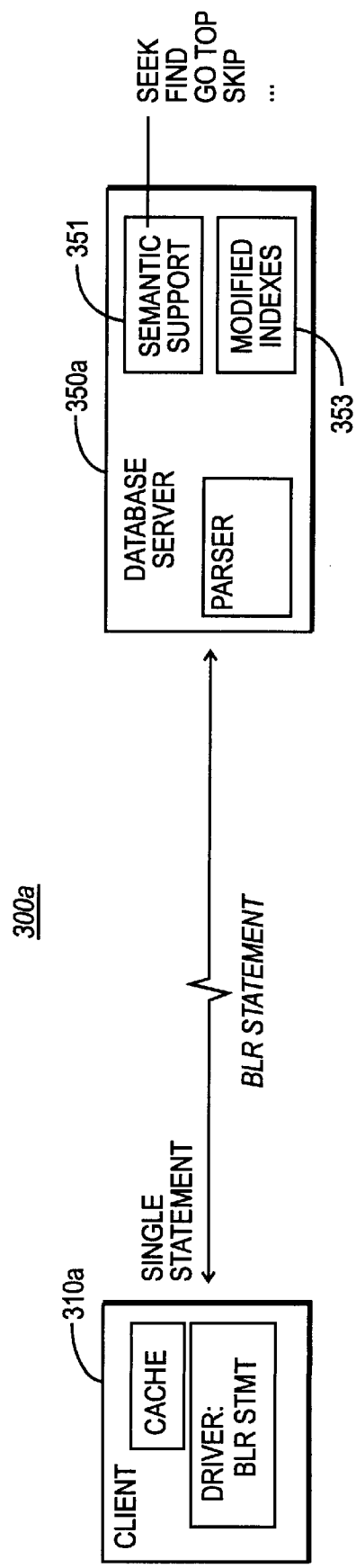

FIGS. 3A and 3B are block diagrams contrasting the approach of the present invention for providing scrollable cursors (FIG. 3B) with a conventional approach (FIG. 3A). In FIG. 3A, the Client 310, which is connected to a Database Server 350 via a network, emulates the scrolling locally, by using a multitude of SQL commands together with a local cache. There are numerous disadvantages to this approach. For one, issuing a large number of SQL commands greatly increases network traffic, thereby degrading the performance of the network. Moreover, the multitude of SQL commands places a tremendous burden on the Database Server 350, as it must expend precious resources parsing and processing each one of the many commands.

To make the approach of FIG. 3A function in real-time, a cache memory is required, for offsetting the otherwise poor performance of the arrangement. Employing a cache, particularly a large one, is not without difficulties, however. In particular, additional methods (and associated overhead) are required for maintaining concurrency between the records in the cache and corresponding records resident on the Database Server. In this regard, the cache is employed more for optimizing network I/O, instead of optimizing server load. As an additional disadvantage, a large cache further complicates the task of the client (i.e., specifically the local engine and SQL link or interface) in the instance of updated records. Since the copy of records in the cache may be stale, the client must undertake additional steps to ensure that a record which has been updated locally has not, in fact, already been changed at the server.

FIG. 3B is a block diagram illustrating modification of the System 300, now System 300a, in accordance with the present invention. As shown, the Client (now Client 310a) includes a driver which formulates a single BLR statement, instead of a multitude of SQL statements. Further, the Database Server (now Database Server 350a) is modified as follows. First, native navigational support is added to the Server, as shown at 351. In other words, the Server, which is ordinarily set-based, is "taught" navigational techniques.

In operation, the Database Server 350a receives the BLR statement from the Client. This is processed by the Server to generate a node tree of executable commands. The node tree is in turn executed by the Server, specifically by a looper routine using recursive descent methodology. The looper routine, which may be viewed as a large "switch" statement, is modified to provide direct navigational support. Looper includes, for example, case arms for seek, find, skip, and the like. In this regard, the looper routine functions as a dispatcher, and the navigational routines function as handlers. These handlers or routines perform their methodology in the context of a cursor. Each of these methods, in turn, "know about" the different way in which the system retrieves data (i.e., traverses indexes).

In an exemplary embodiment, the looper method may be constructed in the C programming language as follows.

```
 1:  static NOD (request, in_node)
 2:  {
 3:  /******************************
 4:   *
 5:   *      l o o p e r
 6:   *
 7:   ******************************
 8:   *
 9:   *  Functional description
10:   *      Cycle thru request execution tree. Return next node for
11:   *      execution on stall or request complete.
12:   *
13:   ******************************/
14:  STA impure;
15:  NOD *ptr, *end, handlers, node, top_node = NULL, prev_node;
16:  TRA transaction;
```

```
17:
18:   // . . .
19:
20:   /* This is the main execution loop in the engine; switch based
21:      on the current node type in the execution tree. */
22:
23:   while (noe && !(request->req_flags & req_stall))
24:       {
25:       switch (node->nod_type)
26:       {
27: // . . .
28:     case nod_stream:
29:         node = find (node);
30:         break;
31:
32:     case nod_find:
33:         node = find (node);
34:         break;
35:
36:     case nod_find_dbkey:
37:     case nod_find_dbkey_version:
38:         node = find_dbkey (node);
39:         break;
40:
41:     case nod_set_index:
42:         node = set_index (node);
43:         break;
44:
45:     case nod_set_bookmark:
46:         node = set_bookmark (node);
47:         break;
48:
49:     case nod_release_bookmark:
50:         node = set_bookmark (node);
51:         break;
52:
53:     case nod_end_range:
54:         node = RNG_end (node);
55:         break;
56:
57:     case nod_delete_range:
58:         ndoe = RNG_delete (node);
59:         break;
60:
61:     case nod_delete_range:
62:         if (request->req_operation == req_evaluate)
63:         {
64:         RNG_delete_ranges (request);
65:         request->req_operation = req_return;
66:         }
67:         node = node->nod_parent;
68:         break;
69:
70:     case nod_range_relation:
71:         node = RNG_add_relation (node);
72:         break;
73:
74:     case nod_release_lock:
75:         if (request->req_operation == req_evaluate)
76:         {
77:         desc = EVL_expr (node->nod_arg [e_rellock_lock]);
78:         RLCK_release_lock (* (LCK*) desc->desc_address);
79:         request->req_operation = req_return;
80:         }
81:         node = node->nod_parent;
82:         break;
83:
84:     case nod_release_locks:
85:         if (request->req_operation == req._3evaluate)
86:         {
87:         RLCK_release_locks (request->req_attachment);
88:         request->req_operation = req_return;
89:         }
90:         node = node->nod_parent;
91:         break;
92:
93:     case nod_force_crack:
94:         if (request->req_operation == req_evaluate)
95:         {
96:         RSE_MARK_CRACK (* (RSB*)node->nod_arg [1],rsb_crack|rsb_forced_crack);
```

```
 97:        request->req_operation = req_return;
 98:      }
 99:         node = node->nod_parent;
100:         break;
101:
102:   case nod_reset_stream:
103:        if (request->req_operation == req_evaluate)
104:        {
105:      RSE_reset_position (* (RSB*) node->nod_arg [e_reset_from_rsb],
106:          request->req_rpb+(USHORT)node->nod_arg [e_reset_to _stream]);
107:      request->req_operation = req_return;
108:      }
109:         node = node->nod_parent;
110:         break;
111:
112:   default:
113:       BUGCHECK (168); /* action not yet implemented */
114:     }
115: }
116:
117: // . . .
118:
119: return node;
120: }
```

The above case arms show the processing associated with particular verbs. The nod_find (line 32) case arm finds a record based on a key value. The nod_find_dbkey (line 36) case arm, on the other hand, finds a record based on a dbkey. The nod_set_index (line 41) case arm "sets" a particular index, such as done in dBASE, for establishing a particular order of the table. The nod_set_bookmark and nod_release_bookmark case arms (lines 45 and 49) sets and releases bookmarks, respectively. Finally, a nod_stream is what a BLR stream maps to; it opens a stream.

B. Modification of B-tree indexes

1. Overview

Providing native navigational support alone is not sufficient for creating scrollable cursors at the Server level. Instead, the basic indexes which support logical views of the Server's relational database tables must themselves be modified to support navigational capability. Moreover, new index traversal methods are required for processing the modified indexes. Before describing these in detail, it is first helpful to examine the detailed structure of indexes employed by the Database Server.

2. Index structure

Figure 4A:
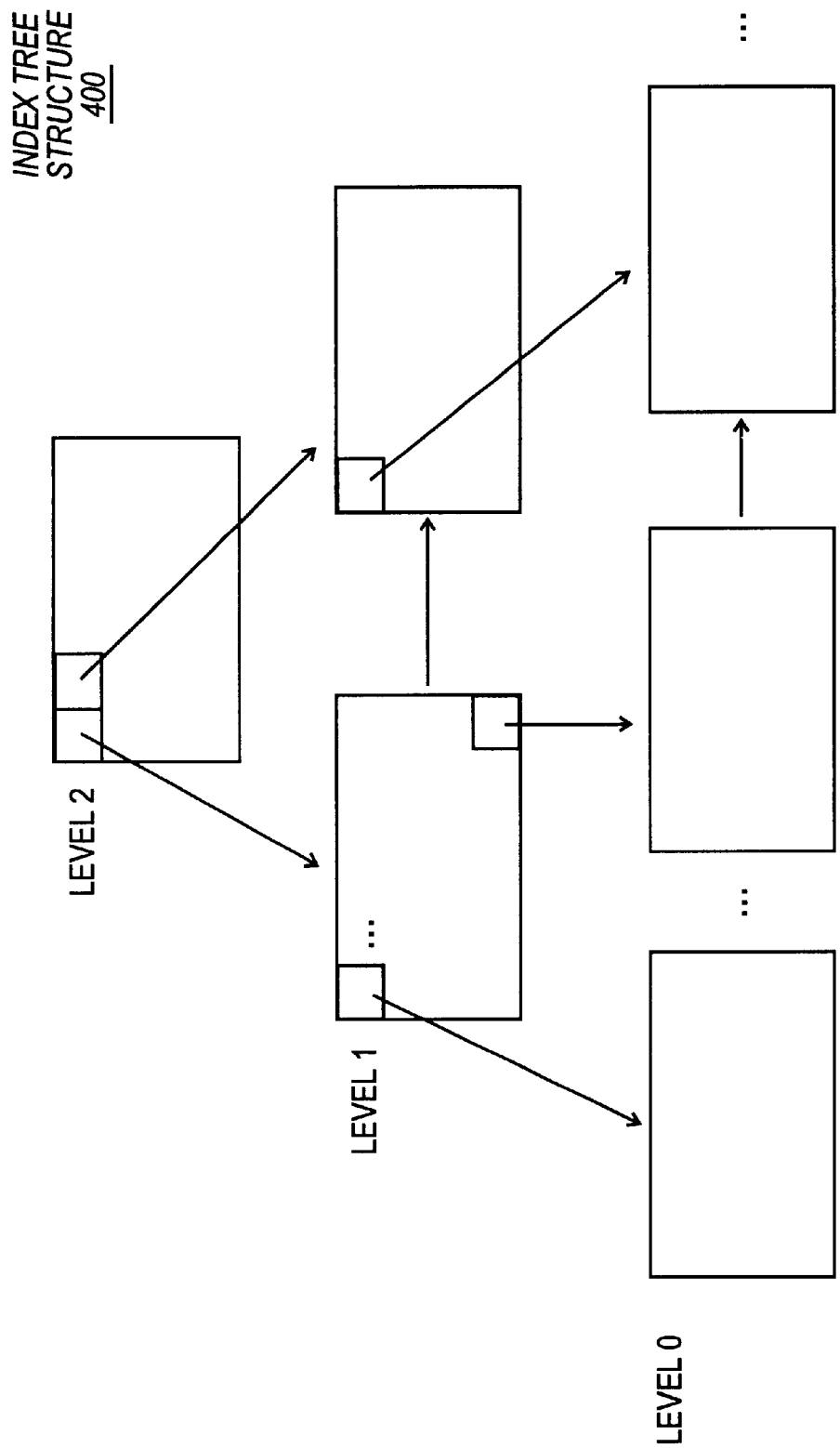
FIG. 4A is a block diagram illustrating an index organized as a B-tree data structure.

In the system of the present invention, an index is employed to store pointers to all the records in a relation (i.e., table), sorted on the fields for which the index is defined. As shown in FIG. 4A, an index is organized as a tree 400 of pages, collectively known as a B-tree. Trees are organized into levels, numbered from 0 at the lowest level and increasing towards the root of the tree. The tree 400, for example, is organized into three levels. Pages at levels 1 and higher contain pointers to pages at the next lower level. Each page has a sibling pointer which points to the next page in the same level.

Figure 4B:
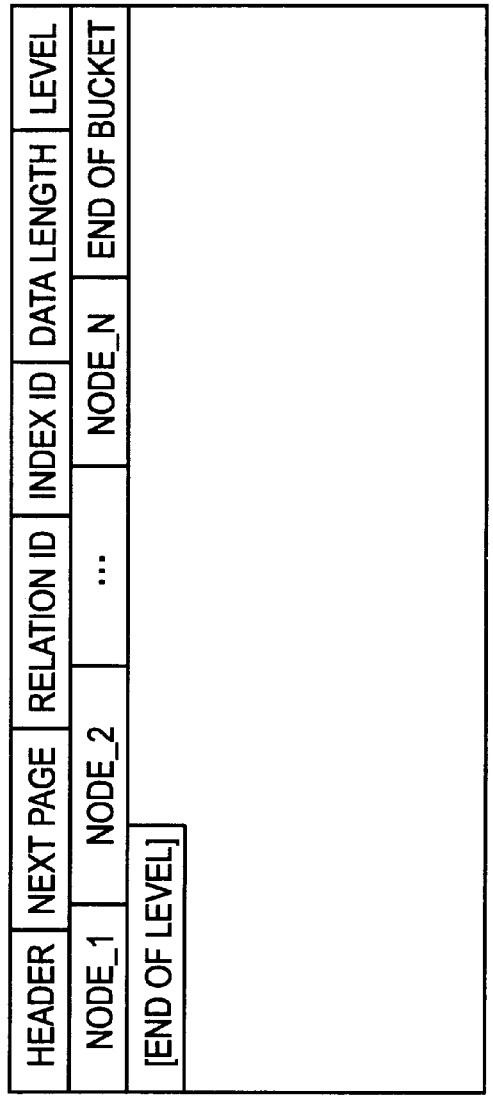
FIG. 4B is a block diagram illustrating a B-tree page layout employed in the system of the present invention.

As shown in FIG. 4B, a B-tree page layout, such as page layout 430, specifies that each page hold a variable number of variable-length nodes. The page is organized as follows:

(1) page header; flags for a B-tree page could be:
  page is first one in its level
  page has not been propagated to a higher level
  page is marked for deletion
  page is part of a descending index
(2) page number of the next B-tree page on the same level
(3) relation id; redundant info for consistency check
(4) index id; redundant info for consistency check
(5) length of data in the page
(6) level number of the page in the index, starting with 0 for the root page
(7) an array of leaf nodes (followed by end-of-page marker)
(8) total length of all the nodes (for ease in copying)

The end-of-page marker is used to mark the end of the array. In an exemplary embodiment, this is an empty node with the record number set to −2. In addition, an end-of-level marker is used to mark the end of the last page in the level. This is an array node with a record number of −1.

The B-tree nodes, which are stored within the B-tree pages, have the following format:

(1) record number or page number (pointer): points to record or B-tree page
(2) length of prefix: the number of bytes that the key value has in common with the previous record's key value
(3) length of data: the number of bytes left after the prefix
(4) data: the bytes remaining after the prefix Each B-tree node contains a pointer, either to a record or to another B-tree page. Nodes at level 0 are called leaf nodes; each contains a record number. Nodes at higher levels contain the page number of the B-tree page at the next level. The next three fields in the B-tree node describe the key value of a particular record. The key value is a concatenation of the values of the indexed fields for that record. Key values stored at levels 1 or higher contain the first key value stored on the lower level page, making it possible to step down the tree to find a particular record or range of records.

Key values are stored in the index using "prefix compression," which is illustrated by the prefix compression table 440 in FIG. 4C. Since nodes are arranged in sorted order, it is often the case that characters in common exist between successive key values (stored in previous nodes). Prefix compression takes advantage of these characters in common. Table 440 illustrates the approach for an index defined on a character field. Here, the leftmost column describes the value of the indexed field for the first few records in the index. The next three fields contain the values which are stored in the corresponding B-tree node. When a particular page is required at run time, it is read in from disk and "expanded" in system memory: its key values are dynamically expanded into their uncompressed state.

When an index is defined, during system operation, the records in the relation or table are sorted on the key field(s)

of the index. For each record, the key value and the record number are both inserted in the index. At the outset, only one B-tree page in the index, with a level of 0, exists in the index. Nodes are added successively to the end of the page, using prefix compression to store the key values. When that page is filled, a sibling page is created at level 0. A new root page is allocated at level 1, which points to both level 0 pages. Subsequent records are then added to the sibling page. As new pages are created at level 0, they are added to the root page at level 1. When a level 1 page is filled, a sibling page is allocated. A new root page at level 2 is created, which points to both level 1 pages. The process continues up to a maximum number of levels (e.g., 16 levels). FIG. 4D illustrates a simple B-tree index page 460 with one level, defined on an EMPLOYEES relation.

3. B-Tree modifications for bi-directional navigation (a) Overview

Conventionally, SQL database systems only include methods for traversing forward through leaf-level pages of B-tree indexes. One reason that SQL database servers are limited to this forward traversal is that the key value information stored in the pages is compressed using the above-described prefix compression. Since each successive key value eliminates information in common with its predecessor key value, the task of traversing both within a leaf page and between leaf pages is complicated. One cannot simply pick a starting node and then traverse backwards. The actual key value stored at that point cannot be determined as the information in common with prior nodes is not known, since no previous nodes have been visited in this instance. In order to guarantee that one can read any node on the page, it may be necessary to go back to the very beginning of the page (or find the last node which is fully described).

Unlike B-tree indexes in a conventional SQL (i.e., set-oriented) database server, the indexes in the system of the present invention are modified to support bi-directional navigation through a cursor, including both intra-page and inter-page navigation. The former is traversing forward and backward within a leaf page; the latter is traversing forward and backward along the leaf pages. Each will be described in turn.

(b) Modification for intra-page navigation

Figure 5:
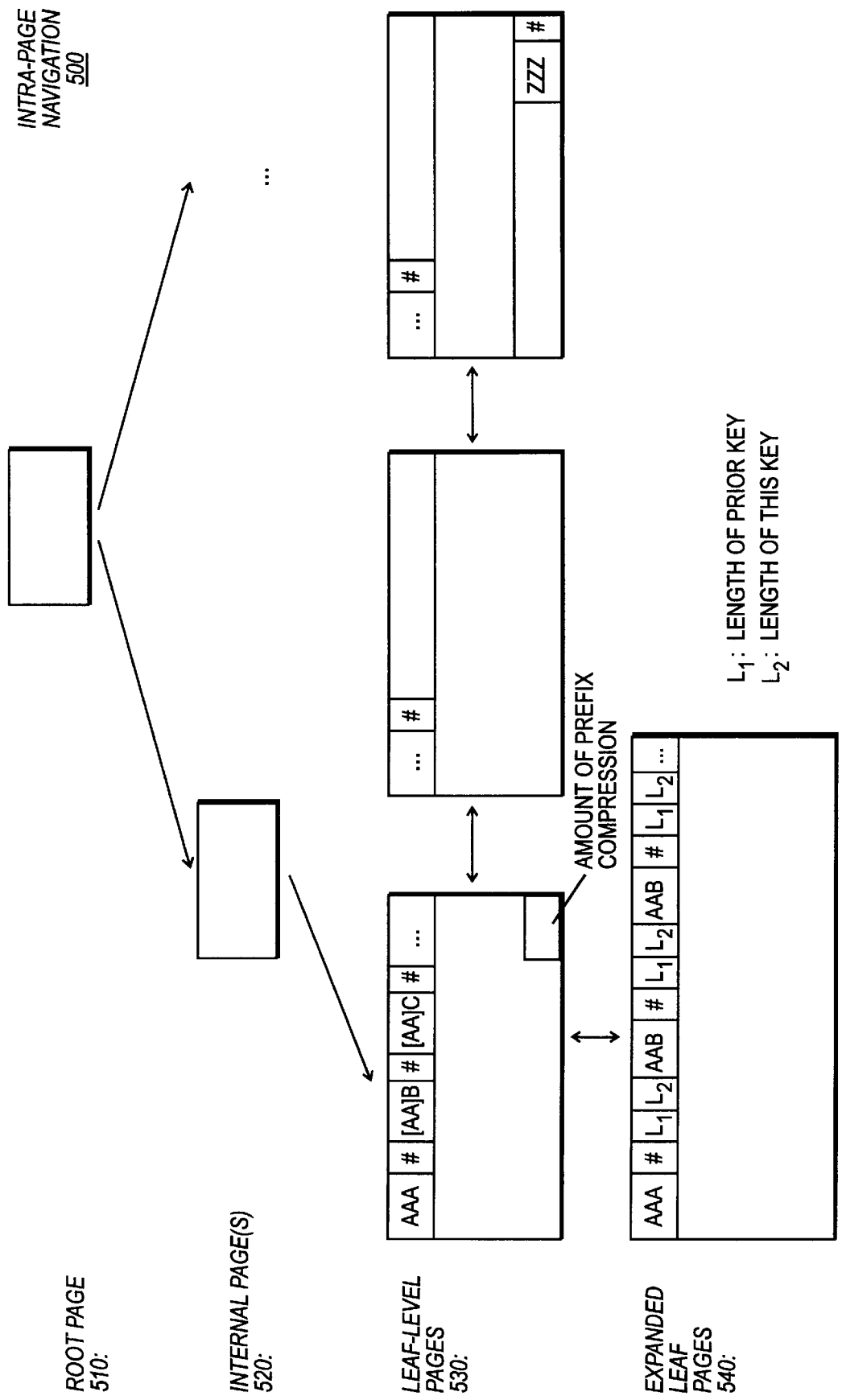
FIG. 5 is a block diagram illustrating intrapage navigation among leaf-level pages of a B-tree index in the system of the present invention.

The indexes are modified so that the Database Server can navigate both forward and backward within a particular leaf-level page of the B-tree indexes themselves. As shown in FIG. 5, each of the B-tree leaf pages 530, upon expansion into expanded leaf pages 540, stores not only uncompressed key values but also the length of the prior key ($L_1$) and the length of the current key ($L_2$). This allows the system to go forward to the next node or backward to the previous node, even though the key values at the nodes are prefix compressed. The lengths may be expressed in terms of relative (or even absolute) offsets. The expanded pages themselves are maintained in a buffer cache, which is located (conceptually) between the Database Server and the database table. When a page is expanded, therefore, it is assumed that it will be needed again (i.e., by the current process or by another process). When navigating back and forth in an index, the system can utilize a previously-expanded page, so long as another process is not updating that specific page. When the original B-tree page is updated, the expanded page is released (i.e., freed from memory).

Also shown in FIG. 5, each of the leaf pages 530 stores the amount of prefix compression for the page so that the memory buffer required for expansion of that page is known before the actual expansion (i.e., into an expanded index page) is performed. Since the memory buffer required for holding the largest "theoretical" index page which has expanded can be quite large, on the order of 100 megabytes or more, the system maintains a running count of expanded (uncompressed) space required by each node. As a new node is added, the running count is updated accordingly. In this manner, pages can be expanded in an efficient manner.

(c) Modification for inter-page navigation

Figure 6:
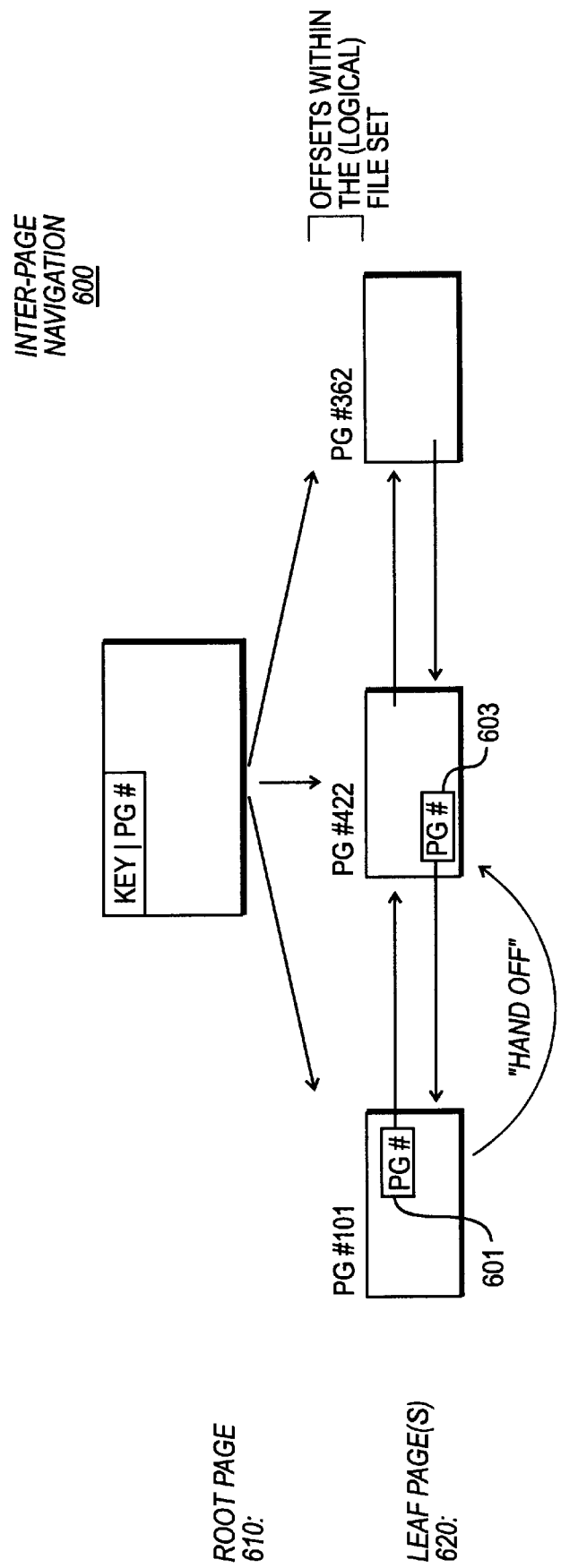
FIG. 6 is a block diagram illustrating interpage navigation among leaf-level pages of a B-tree index in the system of the present invention.

The indexes are further modified so that the Database Server can navigate both forward and backward between leaf-level pages of the B-tree indexes. FIG. 6 illustrates inter-page navigation 600 for a tree comprising a root page 610 and leaf page(s) 620. The leaf pages are modified to add, in addition to forward page links, backward page links. For the two-level index 600 in FIG. 6, each leaf page on disk stores two page numbers: one pointing forward (pointer 601) and another pointing backward (pointer 603). Thus, each page stores a page pointer or ID for identifying both the previous and the next (logical) page (i.e., in chain of pages). The pages themselves need not be stored contiguously on disk. Instead, the system, using the page identifiers or numbers stored on disk, loads relevant pages on an "as needed" basis.

Also shown, the root page 610 stores page numbers so that the root page stores key/page number combinations. Thus, the root page resembles the leaf pages in that it stores key values which are prefix compressed; instead of storing record numbers, however, the root page stores page numbers. The page numbers, in turn, refer to the pages as they are stored on disk. To access page number 101, for instance, the system would seek to a location which is the value of the page number (e.g., 101) multiplied by the size of the page (e.g., 1024 bytes). The page numbers, therefore, refer to offsets within the particular file set which comprises a single logical file (which may be made up of one or more physical files).

Besides adding bi-directional page pointers, the system also modifies the "handoff" of pages, when traversing from one page to another. Consider a scan of an index. Such an operation would occur, for instance, in the following SQL query:

SELECT*

FROM employees

ORDER BY emp#

Here, the emp# field represents the field which the table is indexed on.

The query would be implemented using the index, since it contains the result, already pre-sorted. Particularly, the query would be satisfied by scanning the emp# index: starting at the beginning of the index and traversing the sequence of leaf pages (as specified by the page pointers). The record numbers would be read from the nodes of the leaf pages and the corresponding records would be retrieved and returned to the user. When traversing the leaf pages, the currently-held leaf page is not released until the system successfully obtains a lock on the next leaf page. The process of locking the next page and releasing the previous page is the "handoff." This is required to ensure concurrency—that another process does not split a page while it is being viewed (i.e., by the current process). If a lock were not obtained on the next page before traversing, it is possible that the next page might be split, thereby generating a new page between the two pages (i.e., between the two pages which the current process is traversing). As part of concurrency control, therefore, pages are handed off in a left-to-right fashion.

Consider a query which scans the index in an ascending fashion executed simultaneously with a query which scans the index in a descending fashion. In such an instance, it is possible to trigger a "deadlock." A deadlock occurs when a first process (e.g., ascending scan) waits for a page locked by a second process (e.g., descending scan), which itself is waiting for a page locked by the first process. If no other precautions are undertaken, deadlocks will occur when pages are handed off not only from left-to-right, but also from right-to-left.

C. Navigation methods

1. Intrapage

Intrapage navigation is the process of moving among records on a single page. The workhorse for doing the intrapage navigation is a NA_get_record function which, in an exemplary embodiment, may be constructed as follows (using C programming language):

```
1:   BOOLEAN NAV_get_record (
2:       RSB             rsb,
3:       IRSB_NAV        impure,
4:       RPB             *rpb,
5:       RSE_GET_MODE    direction)
6:   {
7:   /******************************************
8:    *
9:    *     N A V _ g e t _ r e c o r d
10:   *
11:   *******************************************
12:   *
13:   * Functional description
14:   *    Get a record from a stream, either in
15:   *    the forward or backward direction, or the
16:   *    current record. This routine must set
17:   *    BOF, EOF, or CRACK properly.
18:   *
19:   *******************************************/
20:      IDX      *idx;
21:      IRB      retrieval;
22:      NOD      retrieval_node;
23:      BTR      page;
24:      BTN      node, next;
25:      EXP      expanded_page;
26:      BTX      expanded_node, expanded_next = NULL;
27:      WIN      window;
28:      SLONG    number;
29:      USHORT   l;
30:      KEY      key, upper, lower;
31:      UCHAR    *p, *q;
32:
33:      idx = (IDX*) ((SCHAR*) impure
34:          + (SLONG) rsb->rsb_arg [RSB_NAV_idx_3offset]);
35:
36:      // ...
37:
38:      /* find the last fetched position from the index */
39:      window.win_page = impure->irsb_nav_page;
40:      next =   get_position (rsb, impure, &window, direction,
41:                  &expanded_next);
42:      MOVE_FAST   (impure->irsb_nav_data, key.key_data,
43:                      impure->irsb_nav_length);
44:      retrieval_node
45:         = (NOD) rsb->rsb_arg [RSB_NAV_index]; retrieval
46:
47:      /* set the upper (or lower) limit for navigational retrieval */
48:
49:      if ((direction == RSE_get_forward) && retrieval->irb_upper_count)
50:         {
51:         upper.key_length = impure->irsb_nav_upper_length;
52:         MOVE_FAST ((impure->irsb_nav_data
53:             + (SLONG) rsb->rsb_arg [RSB_NAV_key_length]),
54:             upper.key_data, upper.key_length);
55:         } else if ((direction == RSE_get_backward)
56:                         && retrieval->irb_lower_count)
57:         {
58:         lower.key_length = impure->irsb_nav_lower_length;
59:         MOVE_FAST ((impure->irsb_nav_data +
60:             (SLONG) rsb->rsb_arg [RSB_NAV_key_length]),
61:             lower.key_data, *lower.key_length);
62:         }
63:      /* Find the next interesting node.
64:         If necessary, skip to the next page */
65:
66:      for (;;)
67:         }
```

```
 68:    node = next;
 69:    expanded_node = expanded_next;
 70:    if (node)
 71:       number = BTR_get_quad (BTN_NUMBER (node));
 72:    page = (BTR) window.win_buffer;
 74:    /* in the backwards case, check to make sure we haven't hit the
 75:       beginning of a page, and if so fetch the left sibling page.*/
 76:
 77:    if (direction == RSE_get_backward)
 78:     {
 79:     if (node < (BTN) page->btr_nodes)
 80:        {
 81:        expanded_page = window.win_expanded_buffer;
 82:
 83:        /* if there is no left sibling, we are at bof */
 84:
 85:        if (!page->btr_left_sibling)
 86:           {
 87:           RSE_MARK_CRACK (rsb, rsb_bof);
 88:           break;
 89:           }
 90:
 91:        /* otherwise, find the page to the left
 92:        and go to the end of it */
 93:
 94:        page = BTR_left_handoff (&window, page, LCK_read);
 95:        expanded_page = NAV_expand_index (&window, NULL_PTR);
 96:        next = BTR_last_node (page, expanded_page, &expanded_next);
 97:        continue;
 98:        }
 99:     }
100:    else
101:    /* In the forwards case, check for end of page. If we find
102:       it, do a simpie handoff to the right sibling page. */
103:
104:     {
105:     if (number == END_LEVEL)
106:        {
107:        RSE_MARK_CRACK (rsb, rsb_eof);
108:        break;
109:        }
110:
111:     /* if find the end of the page, go to the page on the right */
112:
113:     if (number == END_BUCKET)
114:        {
115:        page = (BTR) window.win_buffer;
116:        page = (BTR) HAN.DOFF (&window, page->btr_sibling,
117:                LCK_read, pag_index);
118:
119:        next = (BTN) page->btr_nodes;
120:        If (expanded_age = window.win_expanded_buffer)
121:           expanded_next = (BTX) expanded_age->exp_nodes;
122:        continue;
123:        }
124:     }
125:
126:    /* Build the current key value from the prefix
127:       and current node data. */
128:
129:    if (expanded_node)
130:       {
131:       if (1 = BTN_LENGTH (node) + BTN_PREFIX (node))
132:          {
133:          p = key.key_data;
134:          q = expanded_node->btx_data;
135:          do *p++ = *q++; while (--1);
136:          }
137:       }
138:
139:    else
140:    {
141:       if (1 = BTN_LENGTH (node))
142:          {
143:          p = key.key_data + BTN_PREFIX (node);
144:          q = BTN_DATA (node);
145:          do *p++ = *q++; while (--1);
146:          }
147:    }
148:
```

```
149:        1 = BTN_LENGTH (node) + BTN_PREFIX (node);
150:
151:        /* Make sure we haven't hit the upper (or lower) limit. */
152:        if ((direction == RSE_get_forward) && retrieval->irb_upper_count
153:           && compare_keys (idx, key.key_data, 1, &upper;
154:           retrieval->irb_generic.
155:        & (irb_descending | irb_partial | irb_starting)) > 0)
156:        {
157:        RSE_MARK_CRACK (rsb, rsb_crack);
158:        break;
159:        }
160:        if ((direction == RSE_get_backward)
161:           && retrieval->irb_lower_count
162:           && compare_keys (idx, key.key_data, 1,
163:           &lower, retrieval->irb_generic
164:           & (irb_descending | irb_partial | irb_starting)) > 0)
165:        {
166:        RSE_MARK_CRACK (rsb, rsb_crack);
167:        break;
168:        }
169:
170:        // . . .
171:
172:        /* reset the current navigational position in the index */
173:
174:        rpb->rpb_number = number;
175:        if (direction != RSE_get_current)
176:           set_position (impure, rpb, &window, node,
177:                expanded_node, key.key_data, 1);
178:
179:        RELEASE     (&window);
180:
181:        key.key_length = 1;
182:        if (get_record (rsb, impure, rpb, &key, FALSE))
183:         return TRUE;
184:
185:        /* if here, we didn't find the record at the current position,
186:           so it must have been deleted out from under; by definition we
187:           are on a crack (already markedby get_record()) */
188:
189:        if (direction == RSE_get_current)
190:           return FALSE;
191:
192:        next = get_position (rsb, impure, &window,
193:                    direction, &expanded next);
194:        }
195:
196:        RELEASE (&window);
197:
198:        /* crack, bof, or eof must have been set at this point */
199:
200:        return FALSE;
201:        }
(line numbers added)
```

As shown (at lines 2–5), the function is invoked with four parameters: rsb, impure, rpb, and direction. Direction simply indicates whether the method is to operate in a forward or backward direction. Impure is a pointer to an area which is the variable-link tail of a request—that is, the data area of a request. In the context of this routine, the area is used for storing index descriptions, for example. The rsb and rpb parameters require further explanation.

The rsb parameter defines a Record Source Block. This is a data member describing the record stream and, thus, acts as a descriptor for the record. In an exemplary embodiment, the record source block may be constructed as follows:

```
/* Record Source Block */
typedef struct rsb {
    struct blk   rsb_header;
    RSB_T        rsb_type;
    UCHAR        rsb_stream;
```

```
    USHORT       rsb_count;
    USHORT       rsb_flags;
    ULONG        rsb_impure;
    ULONG        rsb_cardinality;
    struct rsb   *rsb_next;
    struct rel   *rsb_relation;
    struct str   *rsb_alias;
    struct prc   *rsb_procedure;
    struct fmt   *rsb_format;
    struct nod   *rsb_any_boolean;
    struct rsb   *rsb_arg [1];
} *RSB;
```

The data members function as follows:
(a) rsb_header: rsb header
(b) rsb_type: type of rsb
(c) rsb_stream: stream, if appropriate
(d) rsb_count: number of sub arguments
(e) rsb_flags: flags
(f) rsb_impure: offset to impure area (g) rsb_cardinality: estimated cardinality of stream
(h) *rsb_next: (pointer to) next rsb, if appropriate
(i) *rsb_relation: (pointer to) relation, if appropriate
(j) *rsb_alias: (pointer to) SQL alias for relation
(k) *rsb_procedure: (pointer to) procedure, if appropriate
(l) *rsb_format: (pointer to) format, if appropriate
(m) *rsb_any_boolean: (pointer to) any/all boolean The other parameter, rpb, describes a Record Parameter Block or RPB data structure:

```
/* Record Parameter Block */
typedef struct rpb {
    SLONG   rpb_number;
    SLONG   rpb_transaction;
    struct rel    *rpb_relation;
    struct rec    *rpb_record;
    struct rec    *rpb_prior;
    struct srpb   *rpb_copy;
    struct rec    *rpb_undo;
    USHORT  rpb_format_number;
    SLONG   rpb_page;
    USHORT  rpb_line;
    SLONG   rpb_f_page;
    USHORT  rpb_f_line;
    SLONG   rpb_b_page;
    USHORT  rpb_b_line;
    UCHAR   *rpb_address;
    USHORT  rpb_length;
    USHORT  rpb_flags;
    struct win    rpb_window;
} RPB;
```

The data members function as follows:
(a) rpb_number: record number in relation
(b) rpb_transaction: transaction number
(c) *rph_relation: (pointer to) relation of record
(d) *rpb_record: (pointer to) final record block
(e) *rpb_prior: (pointer to) prior record block if this is a delta record
(f) *rpb_copy: (pointer to) rpb copy for singleton verification
(g) *rpb_undo: (pointer to) the first version of data if this is a second modification
(h) rpb_format_number: format number in relation
(i) rpb_page: page number
(j) rpb_line: line number on page
(k) rpb_f_page: fragment page number
(l) rpb_f_line: fragment line number on page
(m) rpb_b_page: back page
(n) rpb_b_line: back line
(o) *rpb_address: address of record without header
(p) rpb_length: length of record
(q) rpb_flags: housekeeping flags
(r) win: window into table When a record is read in by the system, the information for the record (e.g., stored in the record header) is copied to the Record Parameter Block. This, in turn, stores a pointer to the actual record (i.e., data) itself.

In general, the NAV_get_record method operates by retrieving a record from the record stream, either in a forward or backward direction (or the current record). The routine then sets BOF (Beginning of File), EOF (End of File), and Crack (i.e., current crack—position before or after a record). Collectively, these are logical constructs which assist in navigation. The record source block (rsb) stores a flag indicating a current state of the record stream—that is, whether at BOF, EOF, or crack. The record stream description, in this context, is a description of the table (i.e., stream of records). Thus, rsb describes that stream. The impure area, for this routine, stores all the indexes for this record stream (table). Also, recall that there is a node in the prefix compressed page and a corresponding node on the expanded page (i.e., the "expanded node"). Those two pointers move in lockstep during the method; if one is updated, so is the other.

The method begins by setting up state information about the current location (i.e., where the user is currently positioned, logically, in the table). The method sets up a "window block" which is a logical data structure into which a data page may be retrieved. This creates a "window" into the database file. At this point, the window block is set to a particular page. The method proceeds to retrieve the corresponding BTN—the B-tree node for that page which is at the current position. In other words, at this point the method gets the page number from the impure area and then fetches that page (i.e., B-tree leaf page); this tells the system the current position in the table.

Next, the method extracts the data from the B-tree node and stores it in a local key variable. Specifically at this point, the method reads the key from the impure area and copies it into a local key variable. This is done in preparation for retrieving data via an index. The method then sets the end condition: the key value at which the method will stop retrieving data. The end condition sets an upperbound (i.e., a value which is not to be exceeded) when traversing in a forward direction, and sets a lowerbound (i.e., a value below which further retrieval is not desired) for backward traversal. At this point, the method has performed initialization and found the previous node.

The method proceeds to find the next node as follows. A loop is established to look for the next node, either forward or backward (depending on the input parameter). If necessary, the method will cross a page boundary—skipping to the next page. In the backward case, the method fetches the left sibling page. If there is no left sibling, then the method has reached the beginning of the file (BOF). If, however, a left sibling is present, the method traverses backwards by performing a left handoff. Thus, intrapage navigation switches to interpage navigation once the end of the current page (i.e., being navigated) has been reached. In the instance where the beginning of file is reached, the BOF flag is set accordingly. Similarly, the EOF flag is set for the instance where the method has reached the end of the file. In the instance where interpage navigation is required, the handoff is performed using a fault-tolerant method described below (under interpage navigation). In a forward traversal, the method performs a locked handoff to a right sibling page, upon reaching the end of a current page. If the method reaches the end of file, it sets the EOF flag.

During the traversal, the method keeps the current key value (i.e., the one stored in the local variable) up to date with the new node. If the method, for instance, has traversed backwards, it must go to the expanded node for retrieving the current key value (because the key values are prefix compressed). For going forward, however, the method need not expand the page. Instead, the key value is set to the current key data plus the prefix. In other words, when traversing forward, the prefix is already known, without having to access the expanded node. The method next checks the boundary limit (i.e., upper or lower limit), for determining whether the boundary has been reached. This is done by comparing the current key against the upper (or lower) value limit. Upon reaching the limit, the crack is set accordingly and the method breaks out of the loop.

The method then calls a set_position routine for setting the current position to the one found. Recall that when the method was invoked, the current position was determined from the impure area. The call to set_position now sets the position of the impure area to reflect the node found. The method then concludes by releasing the logical window (i.e., releasing the lock from the B-tree page). The method may now retrieve the physical data record, which is stored on a data page. If a physical data record is retrieved, the method is done. If not, however, the method continues in the loop, for getting the next node. If the method is successful in finding a record, it returns a Boolean value of true; otherwise, it returns a Boolean value of false.

2. Interpage

Left-to-right interpage navigation may be done in a conventional manner, by using a locked handoff. The right-to-left navigation cannot be done in the same conventional manner, however, as deadlocks will result. A fault-tolerant method for traversing prior pages (i.e., right-to-left traversal), yet avoiding deadlocks, is as follows. The current page is released and the system proceeds to the previous page. Once at the previous page, the system checks whether that page's forward pointer points to the page which was just left. If the two are not identical, the system reads the forward pointer of the then-current page and then traverses to the right. It continues this rightward traversal until it reaches the page which it originally departed from. Once there, the system repeats the process of going left until it reaches a page whose forward pointer agrees with the page which was just departed from. Instead of handing off, therefore, the system just assumes at the outset that the new page is correct. That assumption is then verified to confirm that the new page's forward pointer agrees with the page number of the page which was departed from. If the validation does not hold true, the system steps right until it returns to the original page, whereupon it repeats the process until a new page is found whose forward pointer agrees with the page number of the original page.

Figure 7:
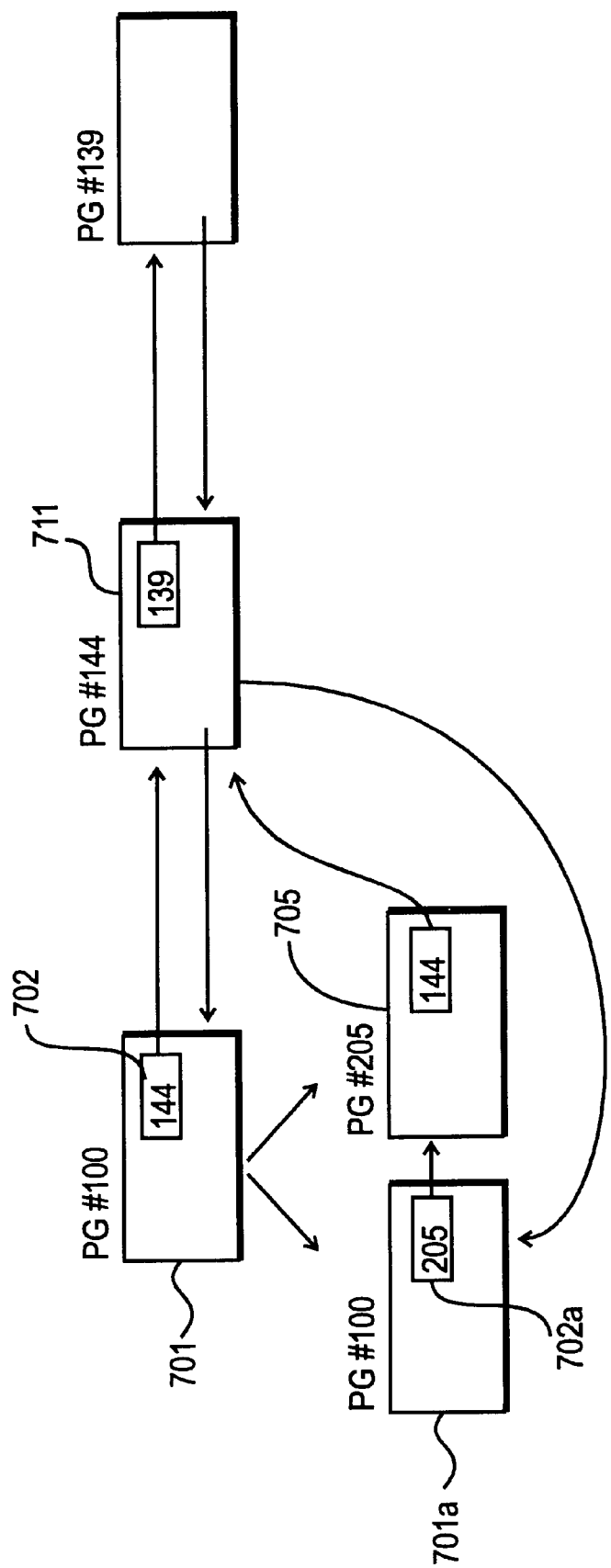
FIG. 7 is a block diagram illustrating the effect of page splitting on the page pointers which are stored on the various pages.

FIG. 7 illustrates the effect of page splitting on the page pointers. Initially, page #100 (shown at 701) stores a Page Pointer 702 pointing to page #144 (shown at 711). Page #100 splits into two pages: page #100 (shown at 701*a*) and page #205 (shown at 705). As a result of the split, the forward page pointer for record #100 is set to the value of 205 (shown at 702*a*); page #205 has its forward page pointer set to the value of 144, thereby linking these two pages into the page chain.

At this point, however, backward pointers (e.g., backward pointer of page #205) are not updated. Preferably, the first process which traverses backwards and finds an incorrect backward-pointing pointer corrects it. In this manner, the overhead for updating backward pointers is shifted to those clients requiring bi-directional scrollable cursors. For a client or user which does not require bi-directional scrollable cursors, therefore, there is little or no impact on performance since those clients employ a left-to-right traversal methodology which does not include any overhead for backwards traversal.

In an exemplary embodiment, a left handoff method may be constructed in the C programming language as follows:

```
 1: BTR BTR_left_handoff (window, page, lock_level)
 2: {
 3: /**************************************
 4:  *
 5:  *   B T R _ l e f t _ h a n d o f f
 6:  *
 7:  **************************************
 8:  *
 9:  * Functional description
10:  * Handoff a btree page to the left. This is more difficult than
11:  * right handoff because we have to traverse pages without handing
12:  * off locks. (A lock handoff to the left while someone was handing
13:  * off to the right could result in deadlock.)
14:  *
15:  **************************************/
16: SLONG    original_age, sibling, left_sibling;
17: WIN    fix_win;
18: BTR    fix_page;
19: DBB    dbb;
20:
21: /* set local variables to original page and its left sibling */
22:
23: original_page = window->win_page;
24: left_sibling = page->btr_left_sibling;
25:
26: /* release the current window first; opens a race condition
27:    in which someone else could update the page so we need to be able to
28:    handle a page which is inserted to the left of us */
29:
30: RELEASE (window);
31:
32: /* fetch the page to the left */
33:
34: window->win_page = left_sibling;
35: page = (BTR) FETCH (window, lock_level, .pag_index);
36:
37: /* if the page is the one we were expecting based on the page number
38:    cached on the original page, we're done */
39:
40: if ((sibling = page->btr_sibling) == original_page)
41:    return page;
42:
43: /* Since not handing off pages, a page could split before
```

-continued

```
44:   * we get to it. To detect, fetch the left sibling pointer and
45:   * then handoff right sibling pointers until reach the page
46:   * to the left of the page passed to us.
47:   */
48:
49:  //while no match
50:
51:  while (sibling != original_page)
52:    {
53:    /* do handoff to right */
54:    page =(BTR)HANDOFF(window,page->btr_sibling,lock_level, pag_index);
55:    sibling = page->btr_sibling;
56:    }
57:
58:    fix_win.win_page = original_page;
59:    fix_page = (BTR) FETCH (&fix_win, LCK_write, pag_index);
60:
61:  /* Check to see whether someone already pointed the original
62:     page to point to the new left page, if so just return. */
63:
64:  if (fix_page->btr_left_sibling == window->win_page)
65:    {
66:    RELEASE (&fix_win);
67:    return page;
68:    }
69:
70:  /* fix up the original page to point to the new left sibling */
71:
72:  MARK (&fix_win);
73:  fix_page->btr_left_sibling = window->win_page;
74:  RELEASE (&fix_win);
75:
76:  return page;
77:  }
```

The method is invoked with a window, which is a logical window into the current physical page. Page is the page number. Lock level is the level at which the new page is to be locked. In a scan through the table, for instance, the page may be locked at the level of "read." The left handoff method hands off a B-tree page to the left. As noted above, this task is more difficult than a right handoff since pages are traversed without handing off locks. The method initializes local variables to store the original page and its left sibling (lines 21–24). Next, the method releases the current window (line 30). Note in particular that this creates a race condition in which another task could insert a page to the left of the original page. Therefore, additional logic (described below) is required for detecting and handling this condition. After releasing the window, the method fetches the page to the left (lines 32–35). Page is set to point to the B-tree page (line 35).

If the page just fetched is the one expected by the method, the method has completed its task and may return page. This determination is made by comparing the page number of the original page to the forward page pointer of the left sibling page (lines 40–41). Otherwise, the page has been split and requires additional processing. This case is handled by fetching the left page (i.e., the next left page) and then continue a right handoff until the method reaches the page to the left of the page passed in. This is done by the "while" loop of lines 51–56. The actual right handoff is done at line 54, by calling a HANDOFF routine. At line 58, the method fixes up the original page to point to the new left page. The method then checks to see whether another process has already pointed the original page to point to the new left page (lines 61–64). In such a case, the method releases the logical window and returns the page. If this has not happened, however, then the method fixes up the original page to point to the next left sibling and thereafter releases the fixed up page and returns page (lines 70–76).

(d) Natural order navigation

Figure 8:
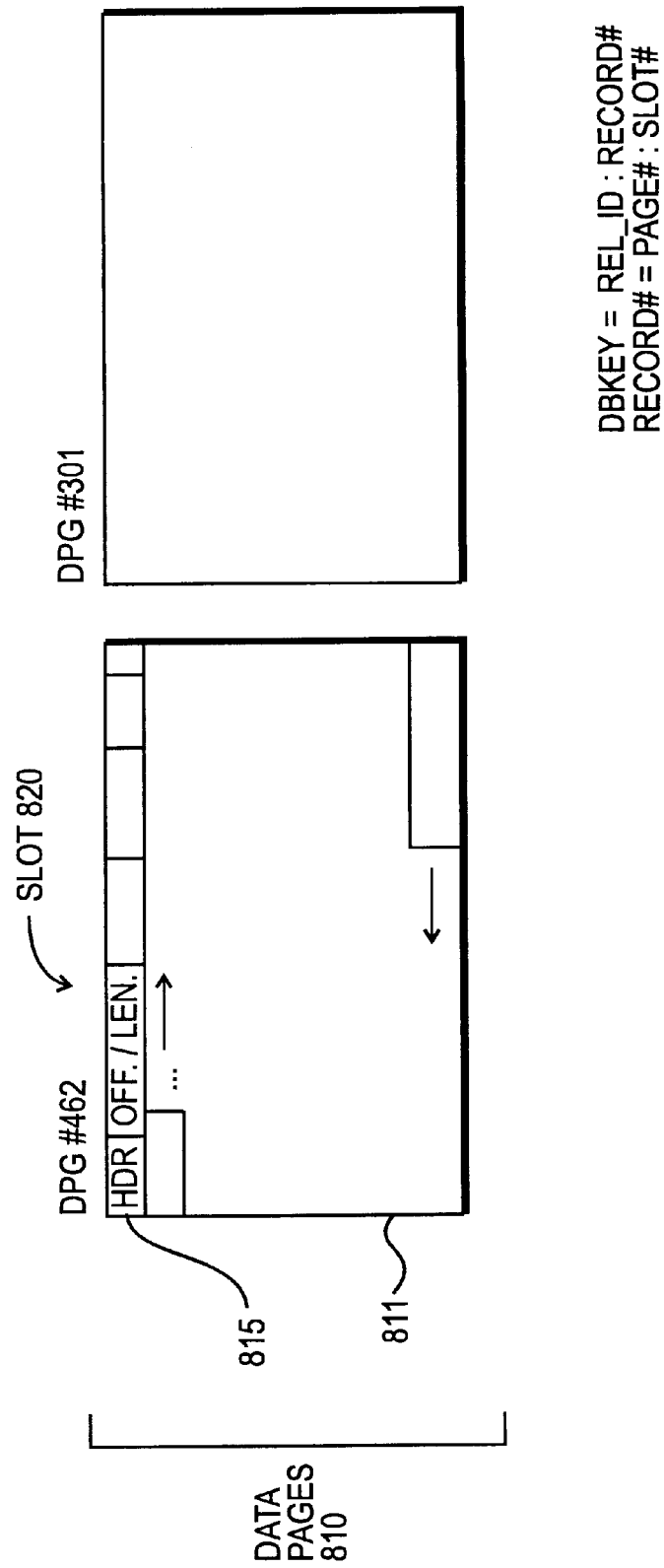
FIG. 8 is a block diagram illustrating natural order navigation among data records stored on data pages (which form a table) in the system of the present invention.

FIG. 8 illustrates traversal of records in natural order (i.e., without an index). The figure shows a sequence of on-disk data pages (DPG constructs) 810 which comprise a table. Each data page comprises a header followed by a plurality of slots (e.g., slot 820), each slot storing an offset/length pair. The slots, in effect, function as a directory to the actual data records themselves (which can be stored any other place on the data page). The slots grow up from the beginning of the data page, and the data records grow down from the end of the data page. The data pages themselves, however, can be physically located anywhere in the database. As a record is deleted, the space occupied by the record is freed (i.e., available for storage of another record). As a new record is added, it is placed on the first free space. As a result, the natural order of the table is random.

Because of the semantics of PC DBMS systems, users expect natural order to imply something other than a random arrangement. SQL users, on the other hand, expect no such ordering, unless they explicitly request ordering by using the "ORDER BY" SQL command. To accommodate navigational users, therefore, the Database Server is modified to provide a unique identifier—dbkey—for identifying a particular record. In essence, it serves as a handle for fetching a particular record.

In an exemplary embodiment, the dbkey comprises two long words storing a relation (table) ID and a record number. The record number here is a logical construct, derived from the page number combined with the slot number for the data record. To navigate forward through database pages in natural order, the system increments a record number variable and attempts to fetch the record with that number (i.e., page/slot combination). If the record number does not exist, the system simply continues on to the next one. In a similar manner, navigating in reverse in a natural order table comprises decrementing the record number (variable), fetching the record associated with that record number (if any), and continuing on in that fashion.

(e) "Bookmark"

The Database Server is also modified to provide a "bookmark"—an indication of where the user is currently located in the table. Once a key is found for a particular record, the database server maintains the location as a bookmark. This, in turn, is surfaced to the Client. To explain the concept of a bookmark, it is helpful to understand how records are stored by the Database Server.

The actual data for a relation is stored on data pages. Each data page is essentially an array of records with the following format:

page header; available data page flags:
data page is orphaned—it does not appear in any pointer page
page is full
a blob or array is on page
sequence number of this data page in the relation; for integrity checking
relation id of this relation; used for integrity checking
number of records or record fragments on this data page
an array of record descriptors, each of the format:
offset of record or record fragment
length of record or record fragment
records and record fragments Thus, a data page may be viewed as an array of pointers to records, together with the records themselves.

A record descriptor describes the location and size of records stored on a given page. For each record, the page stores a record descriptor in an array at the top of the page. As records are stored, the array grows down the page and the records are stored backwards from the end of the page until they meet in the middle. Records vary in size, so that the number of records that can fit on a data page varies. Records can be erased, leaving holes on the page. Calculation of the amount of free space on page is done by looking at the size of all records on page. If necessary to make room for a larger record, the page win be compressed to remove all holes. When the free space is less than the size of the smallest possible record fragment, the page is considered full.

A record is uniquely identified by its record number, known outside the engine (i.e., surfaced to clients) as the dbkey. Conceptually, the record number identifies the offset from the beginning of the relation. The record number generally does not reflect the number of records stored. The record number is calculated by determining how many records could potentially be stored between the beginning of a relation and the current record. This will be explained by way of example.

Consider a database with page size of 1024 bytes and a pointer page size of 1000 bytes. For a slot size of 4 bytes, 250 slots are available on the pointer page, and a total of 1008 bytes available on a data page. If the smallest possible record used 22 bytes (e.g., minimum record data of 6 bytes (using padding if necessary), record header of 12 bytes, and record descriptor of 4 bytes), a maximum of 45 records can be stored on a data page. The record number, in turn, is calculated as:

<max number of records on previous data pages>+<line number on data page>, where the first value is:

<number of data pages stored on previous pages>* 45 and the first value is:

<pointer page number>* 250+<data page slot>.

The formula for determining record number is thus:

<pointer page number>* 250+<data page slot>* 45+<line number>.

Note that record numbers are not necessarily sequential. Unused record numbers may arise since most relations have more than 6 bytes of data per record. In addition, records can be modified and erased, leaving extra space on data pages.

Using the above-described fault-tolerant method, the system can retrieve the data record corresponding to a given record number (i.e., in natural order). In general, the approach is as follows. First, the system assumes that the key value stored at that offset indicated by the record number has not been updated. Next, the system verifies this assumption by comparing the key value found with the one which is expected. The page number, the offset on the page, and the key value are all cached, so that the information can be readily retrieved. When it is retrieved, however, the information is verified by comparing the two key values. In the instance where the key value has changed (i.e., another client has updated the page), the system goes back to the beginning of the page to again look for the key. If the key cannot be located on that page (e.g., the page has been split), the system continues in a left-to-right direction until the key is located. If the key value is found, then the bookmark is reset to that new position. If the key value is not found (i.e., a key value is located which is past the one sought), on the other hand, the record for that bookmark has been deleted by another client. In that case, the bookmark is set to point to the position (i.e., the "crack") just before the key value located which is greater than the key value sought. The crack is, therefore, set to the position where the prior record was deleted.

In an exemplary embodiment, a get_bookmark method may be constructed as follows (using the C programming language).

```
 1:  void NAV_get_bookmark (rsb, impure, bookmark)
 2:  {
 3:  /**************************************
 4:   *
 5:   *    NAV_get_bookmark
 6:   *
 7:   **************************************
 8:   *
 9:   *  Functional description
10:   *    Return a descriptor containing a pointer
11:   *    to a bookmark data structure which describes
12:   *    the current location of a navigational stream.
13:   *
14:   **************************************/
```

```
15:
16:  /* store info necessary to return to this location in the index */
17:
18:  bookmark->bkm_number = impure->irsb_nav_number;
19:  bookmark->bkm_age = impure->irsb_nav_page;
20:  bookmark->bkm_incarnation = impure->irsb_nav_incarn;
21:
22:  /* store current key value, set the key descriptor to point at it */
23:
24:  bookmark->bkm_key_desc.dsc_dtype = dtype_text;
25:  bookmark->bkm_key_dec.dsc_length = impure->irsb_nav_length;
26:
27:  MOVE_FAST (impure->irsb_nav_data, bookmark->bkm_key_data,
28:     impure->irsb_nav_length);
29:  }
```

The method is invoked with three parameters: rsb, impure, and bookmark. The Record Source Block or rsb (previously-described) identifies the current record stream. The impure area (previously-described) represents state information of a request (i.e., "where" a request is in its current state of execution).

Bookmark points to a storage block—a bookmark block—for storing bookmark data. In an exemplary embodiment, a bookmark data structure, BKM, may be constructed as follows:

```
/* bookmark block, used to hold information about the current position
   within an index; a pointer to this block is passed to the user as a
   handle to facilitate returning to this position */ typedef struct bkm {
    struct blk    bkm_header;
    struct bkm    *bkm_next;
    struct dsc    bkm_desc;
    ULONG         bkm_handle;
    SLONG         bkm_number;
    SLONG         bkm_page;
    SLONG         bkm_incarnation;
    SLONG         bkm_expanded_offset;
    USHORT        bkm_offset;
    USHORT        bkm_flags;
    struct dsc    bkm_key_desc;
    UCHAR         bkm_key_data [1];
} *BKM;
```

The data members function as follows:
  (a) bkm_header: bookmark header
  (b) *bkm_next: pointer to next bookmark
  (c) bkm_desc: bookmark descriptor describing the bookmark handle
  (d) bkm_handle: bookmark handle containing pointer to this block
  (e) bkm_number: current record number
  (f) bkm_page: current btree page
  (g) bkm_incarnation: last known incarnation number of current btree page
  (h) bkm_expanded_offset: offset into expanded index page (if it exists)
  (i) bkm_offset: offset into current btree page
  (j) bkm_flags: flag values
  (k) bkm_key_desc: descriptor containing current key value
  (l) bkm_key_data [1]: current key value The set_bookmark method, at lines 18–20, stores information which enables the system to return to this location (i.e., the current location) in the index. This is done by storing the page number, the page offset (i.e., into the actual B-tree page itself), and "incarnation" (i.e., the number of times which it has been updated). Next, the method stores the current key value, setting a key descriptor to point to it (lines 22–25). This indicates what the fully-expanded key value is at the current location. This information is copied into the impure data area (line 28).

The set_bookmark routine is the "flipside" of the get_bookmark routine. In an exemplary embodiment, a set_bookmark method may be constructed as follows (using the C programming language).

```
1:  BOOLEAN NAV_set_bookmark (rsb, impure, rpb, bookmark)
2:  {
3:  /************************************
4:  *
5:  *  N A V _ s e t _ b o o k m a r k
6:  *
7:  ************************************
8:  *
9:  * Functional description
10: *    Set up the impure area so that the current
11: *    position of the stream is that of the
12: *    stored bookmark.
13: *
14: ************************************/
15:
16:  /* save the bookmark state in the impure area for the stream */
17:
18:  impure->irsb_nav_number = bookmark->bkm_number;
19:  impure->irsb_nav_incarnation = bookmark->bkm_incarnation;
20:  impure->irsb_nav_offset = bookmark->b
21:
```

-continued

```
22:  /* store current key value, set key descriptor to point at it */
23:  impure->irsb_nav_length = bookmark->bkm_key_desc.dsc_length;
24:  MOVE_FAST (bookmark->bkm_key_data, impure->irsb_nav_data,
25:     bookmark->bkm_key_desc.dsc_length);
26:
27:  /* if on a crack, BOF or EOF, don't bother to retrieve a record */
28:
29:  if (rsb->rsb_flags & (rsb_bof | rsb_eof | rsb_crack))
30:     return FALSE;
31:
32:  /* go ahead and fetch the physical record into the rph area
33:     return NAV_get_record (rsb, impure, rpb, RSE_get_current);
34: }
```

As before, the method is passed parameters of rsb, impure, and bookmark. In addition, however, it is also passed a record parameter block, rpb. This is so that the current position in the bookmark may be used to set the current record position (as expressed by rpb). At the conclusion of the method, rpb will point to the new record. At lines 16–20, the method stores into the impure area the same data values which were retrieved with the get_bookmark method (i.e., number, incarnation, and offset). At lines 23–25, the method stores into the impure area the key value from the bookmark. At lines 27–30, if the current position lies on a crack, BOF, or EOF, the method will not bother retrieving a record and will simply return false (line 30). Otherwise, the method will fetch the physical record into the rpb area and return that record as its result (lines 32–33).

A stream may be set to the location of the specified bookmark:

```
1:  static NOD set_bookmark (node)
2:  {
3:  /*************************************
4:   *
5:   *    s e t _ b o o k m a r k
6:   *
7:   **************************************
8:   *
9:   * Functional description
10:  *    Set a stream to the location of the
11:  *    specified bookmark.
12:  *
13:  **************************************/
14:  TDBB       tdbb;
15:  REQ        request;
16:  BKM        bookmark;
17:  USHORT     stream;
18:  RPB        *rpb;
19:  RSB        rsb;
20:
21:  tdbb = GET_THREAD_DATA; request = tdbb->tdbb_request;
22:  BLKCHK (node, type_nod);
23:
24:  if (request->req_operation == req_evaluate)
25:     {
26:     bookmark = BKM_lookup (node->nod_arg [e_setmark_id]);
27:     stream = (USHORT) node->nod_arg [e_setmark_stream];
28:     rpb = &request->req_rpb [stream];
29:     rsb = *((RSB*) node->nod_arg [e_setmark_rsb]);
30:
31:     /* check if the bookmark was at beginning or end of file
32:        and flag the rsb accordingly */
33:
34:     RSE_MARK_CRACK(rsb, 0);
35:     if (bookmark->bkm_flags & bkm_bof)
36:        RSE_MARKCRACK (rsb, rsb_bof);
37:     else if (bookmark->bkm_flags & bkm_eof)
38:        RSE_MARK_CRACK (rsb, rsb_eof);
39:     else if (bookmark->bkm_flags & bkm_crack)
40:        {
41:        RSE_MARK_CRACK (rsb, rsb_crack);
42:        if (bookmark->bkm_flags & bkm_forced_crack)
43:           RSE_MARK_CRACK (rsb, rsb_forced_crack);
44:        }
45:
46:     if (!RSE_set_bookmark (rsb, rpb, bookmark))
47:        EXE_mark_crack(rsb,rsb->rsb_flags&(rsb_crack|rsb_eof|rsb_bof));
48:
49:     request->req_operation = req_return;
50:     }
```

```
51:
52:   return node->nod_parent;
53: }
```

Finally, the bookmark is released by:

```
 1: static NOD release_bookmark (node)
 2: {
 3: /**************************************
 4:  *
 5:  *   r e l e a s e _ b o o k m a r k
 6:  *
 7:  **************************************
 8:  *
 9:  * Functional description
10:  *    Deallocate the passed bookmark.
11:  *
12:  **************************************/
13:   TDBB       tdbb;
14:   REQ        request;
15:
16:   tdbb = GET_THREAD_DATA; request = tdbb->tdbb_request;
17:   BLKCHK (node, type_nod);
18:
19:   if (request->req_operation == req_evaluate)
20:     {
21:       BKM_release (node->nod_arg [e_relmark_id]);
22:       request->req_operation = req_return;
23:     }
24:
25:   return node->nod_parent;
26: }
```

While the invention is described in some detail with specific reference to a single preferred embodiment and certain alternatives, there is no intent to limit the invention to that particular embodiment or those specific alternatives. Thus, the true scope of the present invention is not limited to any one of the foregoing exemplary embodiments but is instead defined by the appended claims.

What is claimed is:

1. In a client/server database system, the system including a database server storing a relational database table, the database server in communication with a plurality of clients and transmitting to those clients sets of data records meeting client-specified query conditions, a method for providing the clients with server-based bi-directional scrolling support provided at the database server such that clients can maintain a bi-directional scrollable cursor for such data records without having to emulate such a cursor with multiple query commands, the method comprising:

(a) creating at the database server a plurality of verbs for bi-directional scrolling of the database table, each verb corresponding to a command which a client issues for requesting bi-directional scrolling of the database table at the server;

(b) creating at the database server an index for accessing the database table, said index including an ordered set of leaf pages for accessing the database table according to a particular sort order;

(c) modifying said leaf pages of the index to support bi-directional scrolling by multiple concurrent clients, said modifying step supporting bi-directional traversing among said leaf pages;

(d) receiving a database query including a request from a client to open a cursor at the database table, said database query including a command for bi-directional scrolling of the database table such that the client can scroll the cursor bidirectionally at the database table; and (e) in response to receiving said request, performing bi-directional scrolling at the database server by traversing in a bi-directional manner said modified index;

wherein step (a) includes creating at the database server a plurality of verbs by providing a handler at the database server for each of said verbs, each handler executing at the database server in response to receipt of a particular command from a client for providing the client with bi-directional scrolling of the cursor at the database server.

2. The method of claim 1, wherein said verbs include selected ones of seek, find, and skip, which are performed at the database server in a bi-directional manner.

3. The method of claim 1, wherein each said handler comprises steps executed at the database server for traversing said index in a bi-directional manner.

4. In a client/server database system, the system including a database server storing a relational database table, the database server in communication with a plurality of clients and transmitting to those clients sets of data records meeting client-specified query conditions, a method for providing the clients with server-based bi-directional scrolling support provided at the database server such that clients can maintain a bi-directional scrollable cursor for such data records without having to emulate such a cursor with multiple query commands, the method comprising:

(a) creating at the database server a plurality of verbs for bi-directional scrolling of the database table, each verb corresponding to a command which a client issues for requesting bi-directional scrolling of the database table at the server;

(b) creating at the database server an index for accessing the database table, said index including an ordered set of leaf pages for accessing the database table according to a particular sort order;

(c) modifying said leaf pages of the index to support bi-directional scrolling by multiple concurrent clients, said modifying step supporting bi-directional traversing among said leaf pages;

(d) receiving a database query including a request from a client to open a cursor at the database table, said database query including a command for bi-directional scrolling of the database table such that the client can scroll the cursor bidirectionally at the database table; and (e) in response to receiving said request, performing bi-directional scrolling at the database server by traversing in a bi-directional manner said modified index;

wherein step (c) includes modifying each leaf page to provide forward and backward page pointers, so that a previous page and a next page can be determined for a current leaf page;

wherein said bi-directional traversing of the modified index includes when traversing in a backward direction, releasing the current leaf page before locking the previous page; and wherein said bi-directional traversing of the modified index further includes:

comparing the previous page with a previous page pointer stored by said current page; and if said previous page does not match said previous page pointer, traversing in a forward direction until a page is found which stores a next page pointer which matches said current leaf page.

5. The method of claim 4, wherein step (c) includes:

modifying each leaf page to provide forward and backward page pointers, so that a previous page and a next page can be determined for a current leaf page.

6. The method of claim 5, wherein said bi-directional traversing of the modified index includes:

when traversing in a forward direction, locking the next page before releasing the current leaf page.

7. The method of claim 5, wherein said bi-directional traversing of the modified index includes:

when traversing in a backward direction, releasing the current leaf page before locking the previous page.

8. The method of claim 4, further comprising:

updating the previous page pointer of said current leaf page to point to the page found which stores a next page pointer matching said current leaf page.

9. The method of claim 4, wherein said request of step (d) includes a request to scroll backward in the database table, and wherein said bi-directional traversing of the index in step (e) includes traversing said index in a backward direction.

10. An improved client/server database system, said system including a database server connected to a plurality of clients, said database server storing a database table having an index, the improvement comprising:

means, operably coupled to the database server, for processing commands from the client for bidirectional navigation of the database table; and means, operably coupled to said means for processing commands, for bi-directional traversing said index at the database server, said means including means for bi-directional traversing of leaf pages of said index, such that when traversing the index in a forward direction the database server locks the next page before releasing a current leaf page and when traversing the index in a backward direction, the database server releases the current leaf page before locking the previous page;

wherein said means for processing commands includes handler means for processing selected ones of a seek command, a find command, and a skip command, for seeking, finding, and skipping records in a bi-directional manner, respectively; and wherein said database server is connected to said clients through a computer network, and wherein said handler means operates at the database server.

11. The system of claim 10, further comprising:

concurrency means for providing shared access to the index during bi-directional traversing of the index.

12. The system of claim 11, wherein said index comprises a plurality of index pages and wherein said concurrency means includes:

means for locking a next page of the index before releasing a current page, when traversing the index in a forward direction.

13. The system of claim 11, wherein said index comprises a plurality of index pages and wherein said concurrency means includes:

means for releasing a current page before locking a previous of the index, when traversing the index in a backward direction.

14. The system of claim 13, wherein each page stores a forward pointer pointing to a next page and a backward pointer pointing to a previous page and wherein said concurrency means includes:

means for traversing said index in a backward direction based on the previous pointer stored by the current index page followed by traversing said index in a forward direction until a page is found which stores a forward page pointer matching the current page.

15. In a SQL-based database server system, a method for bi-directional traversing of leaf pages for an index which comprises a B-tree having a plurality of such leaf pages, the method comprising:

(a) for each leaf page, storing a forward pointer pointing to a next page and a backward pointer pointing to a previous page;

(b) when traversing in a forward direction from a current page of the index, locking the next page from the current page and thereafter releasing the current page; and (c) when traversing in a backward direction from the current page of the index, releasing the current page and thereafter locking the previous page, wherein the previous page is located by:

(i) referencing the backward pointer of the current page;

(ii) comparing the forward pointer for the page pointed to by the backward pointer of the current page with an identifier for the current page; and (iii) if the forward pointer for the page pointed to by the backward pointer of the current page does not match the identifier for the current page, traversing the index in a forward direction until a page is found having a forward pointer matching the identifier for the current page.

16. The method of claim 15, wherein step (b) further comprises: locating the next page by referencing the forward pointer stored by the current page.

17. The method of claim 15, wherein each leaf page stores a plurality of index nodes, each node storing a key value for a particular data record together with a pointer to that particular data record.

18. The method of claim 17, wherein each key value is stored in a prefix-compressed format.

19. The method of claim 18, further comprising traversing in a backward direction within a particular leaf page by:

(i) expanding said particular leaf page into an expanded leaf page storing uncompressed key values for each node;

(ii) storing at each node a length for the key value stored thereat; and (iii) traversing to a previous node by navigating to a location within the expanded index page, said location being determined from the length of the key value stored at a current node.

* * * * *